United States Patent
Kim et al.

(10) Patent No.: US 10,412,729 B2
(45) Date of Patent: *Sep. 10, 2019

(54) APPARATUS AND METHOD FOR ALLOCATING RESOURCE IN A MOBILE COMMUNICATION SYSTEM

(71) Applicant: Samsung Electronics Co., Ltd., Gyeonggi-do (KR)

(72) Inventors: Young-Bum Kim, Seoul (KR); Joon-Young Cho, Gyeonggi-do (KR); Hwan-Joon Kwon, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/438,374

(22) Filed: Feb. 21, 2017

(65) Prior Publication Data

US 2017/0164360 A1 Jun. 8, 2017

Related U.S. Application Data

(63) Continuation of application No. 12/663,967, filed as application No. PCT/KR2008/003225 on Jun. 10, 2008, now Pat. No. 9,577,792.

(30) Foreign Application Priority Data

| Jun. 11, 2007 | (KR) | 10-2007-0056862 |
| Sep. 7, 2007 | (KR) | 10-2007-0091147 |
| Oct. 25, 2007 | (KR) | 10-2007-0107977 |

(51) Int. Cl.
*H04W 72/04* (2009.01)
*H04L 5/00* (2006.01)
(Continued)

(52) U.S. Cl.
CPC ....... *H04W 72/0446* (2013.01); *H04L 1/0026* (2013.01); *H04L 1/0028* (2013.01);
(Continued)

(58) Field of Classification Search
None
See application file for complete search history.

(56) References Cited

U.S. PATENT DOCUMENTS 8,144,570 B2 * 3/2012 Tiirola .................. H04L 5/0016
370/203
8,705,456 B2 * 4/2014 Zeira ..................... H04L 1/1671
370/329
(Continued)

FOREIGN PATENT DOCUMENTS

| EP | 1 569 403 | 8/2005 |
| JP | 09-018454 | 1/1997 |

(Continued)

OTHER PUBLICATIONS

InterDigital; "Scheduling and Multiplexing of CQI and ACK/NACK Feedback for Single Carrier FDMA in Evolved UTRA Uplink"; Mar. 27-31, 2006; 3GPP TSG RAN WG1 Meeting #44 bis; R1-060852; pp. 1-8.*

(Continued)

*Primary Examiner* — Robert C Scheibel
(74) *Attorney, Agent, or Firm* — The Farrell Law Firm, P.C.

(57) ABSTRACT

A method for allocating resources in a mobile communication system is provided. The resource allocation method includes determining whether a transmission time of response information indicating presence/absence of an error in received data overlaps a transmission time of channel state information; and when the transmission times overlap each other, allocating, to the response information, (Continued)

a resource block for the channel state information, cyclic shift values in a frequency domain, and orthogonal sequences having orthogonality in a time domain.

12 Claims, 16 Drawing Sheets

(51) Int. Cl.
*H04L 1/00* (2006.01)
*H04L 1/16* (2006.01)
*H04L 27/26* (2006.01)
*H04W 72/12* (2009.01)
*H04B 1/713* (2011.01)
*H04J 13/00* (2011.01)

(52) U.S. Cl.
CPC .......... *H04L 1/1671* (2013.01); *H04L 5/0007* (2013.01); *H04L 5/0026* (2013.01); *H04L 5/0048* (2013.01); *H04L 5/0053* (2013.01); *H04L 5/0055* (2013.01); *H04L 5/0062* (2013.01); *H04L 27/2614* (2013.01); *H04W 72/1257* (2013.01); *H04B 1/713* (2013.01); *H04J 13/004* (2013.01); *H04W 72/04* (2013.01)

(56) References Cited

U.S. PATENT DOCUMENTS

| | | | |
|---|---|---|---|
| 2004/0116142 | A1 | 6/2004 | Wang et al. |
| 2005/0201474 | A1 | 9/2005 | Cho et al. |
| 2006/0274712 | A1* | 12/2006 | Malladi .............. H04B 1/70735 370/345 |
| 2007/0171849 | A1* | 7/2007 | Zhang .................. H04L 1/0026 370/310 |
| 2008/0273513 | A1* | 11/2008 | Montojo ............... H04L 1/1607 370/342 |
| 2008/0287155 | A1* | 11/2008 | Xu ......................... H04L 5/0007 455/522 |
| 2009/0185638 | A1* | 7/2009 | Imamura .............. H04L 1/0009 375/298 |
| 2010/0182975 | A1* | 7/2010 | Malladi ................. H04L 1/1664 370/330 |
| 2011/0305218 | A1* | 12/2011 | Yoon ..................... H04L 5/0057 370/329 |
| 2012/0026967 | A1* | 2/2012 | Pajukoski ............ H04B 1/7103 370/329 |

FOREIGN PATENT DOCUMENTS

| | | |
|---|---|---|
| JP | 10-145278 | 5/1998 |
| KR | 1020050087947 | 9/2005 |
| WO | WO 2005/074312 | 8/2005 |

OTHER PUBLICATIONS

Interdigital, "Scheduling and Multiplexing of CQI and ACK/NACK Feedback for Single Carrier FDMA in Evolved UTRA Uplink", Mar. 31, 2006, 3GPP TSG RAN WG1 Meeting #44bis, R1-060852, pp. 1-8.
NTT DoCoMo, "CDMA-Based Multiplexing Method for Multiple ACK/NACK and CQI in E-UTRA Uplink", Mar. 26-30, 2007, 3GPP TSG RAN WG1 Meeting #48bis, R1-071649, pp. 1-6.
NTT DoCoMo et al.: "CDMA-Based Multiplexing Method for Multiple ACK/NACK and CQI in E-UTRA Uplink", 3GPP TSG RAN WG1 Meeting #48bis, Mar. 26, 2007, R1-071649.
InterDigital: "Scheduling and Multiplexing of CQI and ACK/NACK Feedback for Single Carrier FDMA in Evolved UTRA Uplink", 3GPP TSG RAN WG1 Meeting #bis, Mar. 27, 2006, R1-060852.
NTT DoCoMo et al., "CDMA-Based Multiplexing Method for Multiple ACK/NACK and CQI in E-UTRA Uplink", R1-070862, 3GPP TSG RAN WG1 Meeting #48, Feb. 12-16, 2007.
Nokia Siemens Networks, "Multiplexing Capability of CQIs and ACK/NACKs form Different UEs", R1-072315, 3GPP TSG RAN WG1 Meeting #49, May 7-11, 2007.
Samsung, "Uplink Control Channel Design", R1-072244, 3GPP TSG RAN WG1 Meeting #49, May 7-11, 2007.
Korean Office Action dated Nov. 7, 2014 issued in counterpart application No. 10-2007-0107977.
Texas Instruments, "ACK/NAK and CQI Multiplexing Capacity and Performance in E-UTRA UL", R1-072210, 3GPP TSG RAN WG1#49, May 7-11, 2007, 4 pages.
Eupean Search Report dated Jun. 14, 2017 issued in counterpart application No. 08766187.2-1875, 7 pages.

* cited by examiner

APPARATUS AND METHOD FOR ALLOCATING RESOURCE IN A MOBILE COMMUNICATION SYSTEM

PRIORITY

This application is a Continuation Application of U.S. patent application Ser. No. 12/663,967, which was filed on Dec. 10, 2009, now U.S. Pat. No. 9,577,792, issued Feb. 21, 2017, which is a National Phase Entry of PCT International Application No. PCT/KR2008/003225 which was filed on Jun. 10, 2008, and claims priority to Korean Patent Application No. 10-2007-0056862, which was filed on Jun. 11, 2007, Korean Patent Application No. 10-2007-0091147, which was filed on Sep. 7, 2007, and Korean Patent Application No. 10-2007-0107977, which was filed on Oct. 25, 2007, the contents of each of which are incorporated herein by reference.

BACKGROUND OF THE INVENTION

1. Field of the Invention

The present invention relates generally to an apparatus and method for allocating resources in a mobile communication system, and in particular, to a resource allocation apparatus and method for transmission of control information in a mobile communication system.

2. Description of the Related Art

Recently, mobile communication systems are evolving into advanced systems capable of providing not only the voice communication but also high-speed data communication while guaranteeing mobility for users. In light of such communication environments, Orthogonal Frequency Division Multiplexing (OFDM) and/or its similar Single Carrier—Frequency Division Multiple Access (SC-FDMA) are under study as a high-speed data communication scheme.

Presently, in $3^{rd}$ Generation Partnership Project (3GPP) which is a standard group for asynchronous cellular mobile communication, Long Term Evolution (LTE), also known as Evolved Universal Terrestrial Radio Access (E-UTRA), evolved from the 3rd Generation (3G) mobile communication system is proposed as the next generation mobile communication system.

In addition, the LTE system is developing to a technology to which the OFDM and SC-FDMA technologies are applied. This multiple access scheme is characterized herein by allocating and managing time-frequency resources while maintaining orthogonality therebetween so that the time-frequency resources, over which it will carry data or control information for each user, may not overlap each other.

Meanwhile, in the LTE system, uplink control information includes Acknowledgement (ACK)/Negative ACK (NACK) information which is response information used for making a response to a success/failure in reception of transmitted downlink data, and Channel Quality Indication (CQI) information used for feeding back the downlink channel state.

The ACK/NACK information, which is generally composed of 1 bit, undergoes repeated transmission for improvement of reception performance and expansion of cell coverage. In a Multiple Input Multiple Output (MIMO) system to which multiple input/output antennas are applied, the ACK/NACK information is transmitted for each MIMO codeword. On the other hand, the CQI information is composed of a plurality of bits to express the channel state, and undergoes channel coding before its transmission, for improvement of reception performance and expansion of cell coverage. The block coding or convolutional coding scheme is available as a channel coding method for the CQI information.

A reception reliability required in receiving the control information is determined according to the type of the control information. Generally, a Bit Error Rate (BER) of a minimum of 10e-2~10e-4 is required for ACK/NACK, while a Block Error Rate (BLER) of a minimum of 10e-2~10e-1 is required for CQI.

In the LTE system, regarding the uplink control information, its transmission format is classified according to transmission/non-transmission of uplink data. When simultaneously transmitting data and control information over the uplink, the LTE system performs Time Division Multiplexing (TDM) on the data and control information, and maps the results to time-frequency resources allocated for data transmission before transmission thereof. On the other hand, when transmitting only the control information without data transmission, the LTE system uses an allocated particular frequency band for transmission of the control information.

According to the results made up to now in the standard conference, Physical Uplink Control Channel (PUCCH) is defined as a physical channel for transmitting the control information, and the PUCCH is mapped to the allocated particular frequency band. With reference to FIG. 1, a description will now be made of a detailed transmission structure for the PUCCH.

FIG. 1 is a diagram illustrating a transmission structure for a physical channel PUCCH for transmission of control information over the uplink in a 3GPP LTE system.

Referring to FIG. 1, the horizontal axis represents a time domain, and the vertical axis represents a frequency domain. The time domain corresponds to one subframe 102, and the frequency domain corresponds to a transmission bandwidth 110 of the system.

In the uplink, the basic transmission unit of the time domain is the subframe 102, and has a length of 1 ms. One subframe is composed of two 0.5-ms slots 104 and 106. The slot 104 (106) is composed of a plurality of SC-FDMA symbols 111~124 (131~144). For example, it is assumed in FIG. 1 that one slot is composed of 7 SC-FDMA symbols.

On the other hand, the minimum unit of the frequency domain is a subcarrier, and the basic unit of resource allocation is Resource Blocks (RBs) 108 and 109. The RBs 108 and 109 each is composed of a plurality of subcarriers and a plurality of SC-FDMA symbols. Herein, 12 subcarriers, together with 14 SC-FDMA symbols constituting 2 slots, constitute one RB.

The frequency bands, to which the PUCCH is mapped, are subcarriers corresponding to both ends of the transmission bandwidth 110 of the system, and they correspond to reference numeral 108 are reference numeral 109. The PUCCH can undergo frequency hopping to increase frequency diversity during one subframe, and in this case, slot-by-slot frequency hopping is available.

Shown in FIG. 1 is a structure for performing frequency hopping on a slot-by-slot basis as shown by reference numeral 150 and reference numeral 160. For example, control information #1, which was being transmitted over a pre-allocated frequency band 108 in the first slot 104, is transmitted over another pre-allocated frequency band 109 after undergoing frequency hopping in the second slot 106. On the contrary, control information #2, which was being transmitted over the pre-allocated frequency band 109 in the first slot 104, is transmitted over another pre-allocated frequency band 108 after undergoing frequency hopping in the second slot 106.

In the example of FIG. 1, in one subframe 102, SC-FDMA symbols for the control information #1 are transmitted as shown by reference numerals 111, 113, 114, 115, 117, 138, 140, 141, 142 and 144, while SC-FDMA symbols for the control information #2 are transmitted as shown by reference numerals 131, 133, 134, 135, 137, 118, 120, 121, 122 and 124. Further, SC-FDMA symbols for Reference Signals (RSs) are transmitted at times represented by reference numerals 112, 116, 139 and 143, or reference numerals 132, 136, 119 and 123.

Such RSs each are composed of a predetermined sequence, and used for channel estimation for coherent demodulation at a receiver. In FIG. 1, the number of SC-FDMA symbols for control information transmission, the number of SC-FDMA symbols for RS transmission, and their corresponding positions in the subframe are given by way of example, and they are subject to change according to the type of desired transmission control information and/or the system operation.

Meanwhile, regarding the uplink control information such as ACK/NACK information, CQI information and MIMO feedback information, Code Division Multiplexing (CDM) can be used to multiplex the uplink control information for different users, and CDM has a characteristic that it is robust against interference signals compared with Frequency Division Multiplexing (FDM). A Zadoff-Chu (ZC) sequence is under discussion as a sequence to be used for CDM-multiplexing the control information.

The Zadoff-Chu sequence, since it has a constant signal level (constant envelop) in the time and frequency domains, has a good Peak-to-Average Power Ratio (PAPR) characteristic and shows an excellent channel estimation performance in the frequency domain. In addition, the Zadoff-Chu sequence is characterized in that a circular autocorrelation for a Non-zero shift is 0. Therefore, in the case where the control information is transmitted using the same Zadoff-Chu sequence, User Equipments (UEs) can distinguish the transmitted control information by differentiating cyclic shift values of the Zadoff-Chu sequence.

In the actual wireless channel environment, the cyclic shift values are differently set for individual UEs intended to undergo multiplexing so as to satisfy the condition that they are greater than the maximum transmission delay value of the wireless transmission path, thereby maintaining orthogonality between the users. Therefore, the number of UEs capable of multiple access is determined from the length and cyclic shift values of the Zadoff-Chu sequence. The Zadoff-Chu sequence is applied even to the SC-FDMA symbols for RS transmission, making it possible to identify RSs between different UEs with the cyclic shift values.

Generally, a length of the Zadoff-Chu sequence used for the PUCCH is assumed to be 12 samples, the number of which is equal to the number of subcarriers constituting one RB. In this case, since the maximum possible number of different cyclic shift values of the Zadoff-Chu sequence is 12, it is possible to multiplex a maximum of 12 PUCCHs to one RB by allocating different cyclic shift values to the PUCCHs.

In this context, the LTE system applies cyclic shift values having an at least 2-sample interval between PUCCHs based on the frequency-selective channel characteristic. The application of the cyclic shift values having the at least 2-sample interval restricts the number of cyclic shift values in one RB to 6. In this way, it is possible to maintain the orthogonality between PUCCHs which are associated with the cyclic shift values on a one-to-one basis, without an abrupt loss thereof.

FIG. 2 illustrates an example of multiplexing CQIs for individual UEs with different cyclic shift values of the Zadoff-Chu sequence in the same RB in transmitting CQIs through PUCCHs with the structure of FIG. 1.

Referring to FIG. 2, the vertical axis represents cyclic shift values 0, 1, . . . , 11 (200) of a Zadoff-Chu sequence. The maximum number of channels that can undergo multiplexing in one RB without an abrupt loss of the orthogonality is 6, and shown in FIG. 2 is a case where 6 CQI informations 202, 204, 206, 208, 210 and 212 undergo multiplexing.

For transmission of the CQI information, the same RB and the same Zadoff-Chu sequence are used, and it is shown herein that CQI 202 from UE #1 is transmitted with a cyclic shift '0' 214; CQI 204 from UE #2 is transmitted with a cyclic shift '2' 218; CQI 206 from UE #3 is transmitted with a cyclic shift '4' 222; CQI 208 from UE #4 is transmitted with a cyclic shift '6' 226; CQI 210 from UE #5 is transmitted with a cyclic shift '8' 230; and CQI 212 from UE #6 is transmitted with a cyclic shift '10' 234. With reference to FIG. 1, a description will now be made regarding how to map the control information signals to the Zadoff-Chu sequence in CDM-transmitting the control information using the Zadoff-Chu sequence.

Let's say that for UE #i, a length-N Zadoff-Chu sequence is defined as $g_{(n+\Delta i) \bmod N}$, where n=0, . . . , N−1, $\Delta i$ denotes a cyclic shift value for UE #i, and i denotes a UE index used for identifying UE. Further, let's assume that the control information signal the UE #i desires to transmit is denoted by $m_{i,k}$, where k = 1, . . . , $N_{sym}$. If $N_{sym}$ indicates the number of SC-FDMA symbols for control information transmission in a subframe, the signals $c_{i,k,n}$ (indicating an $n^{th}$ sample of a $k^{th}$ SC-FDMA symbol for UE #i) mapped to the SC-FDMA symbols are defined as Equation (1).

$$c_{i,k,n} = g_{(n+\Delta i) \bmod N} \cdot m_{i,k} \quad (1)$$

where k=1, . . . , Nsym, n=0, 1, . . . , N−1, and $\Delta i$ denotes a cyclic shift value of a Zadoff-Chu sequence for UE #i.

In the example of FIG. 1, the number $N_{sym}$ of SC-FDMA symbols for control information transmission in one subframe is 10, excepting for 4 SC-FDMA symbols for RS transmission, and a length N of the Zadoff-Chu sequence is equal to the number, 12, of subcarriers constituting one RB.

From the viewpoint of UE, a cyclic-shifted Zadoff-Chu sequence is applied at every SC-FDMA symbol, and a control information signal it desires to transmit is formed in such a manner that one modulation symbol is multiplied by the time-domain cyclic-shifted Zadoff-Chu sequence at every SC-FDMA symbol for control information transmission. Therefore, a maximum of $N_{sym}$ control information modulation symbols can be transmitted per subframe. That is, in the example of FIG. 1, it is possible to transmit a maximum of 10 control information modulation symbols during one subframe.

It is possible to increase multiplexing capacity of PUCCH transmitting the control information by further applying time-domain orthogonal covers in addition to the CDM control information transmission scheme based on the Zadoff-Chu sequence. A typical example of the orthogonal cover can include a Walsh sequence. For length-M orthogonal covers, there are M sequences satisfying orthogonality therebetween. Specifically, regarding 1-bit control information such as ACK/NACK, it is possible to increase multiplexing capacity by applying the time-domain orthogonal covers to the SC-FDMA symbols to which the ACK/NACK is mapped before transmission.

In the LTE system, PUCCH for ACK/NACK transmission considers using 3 SC-FDMA symbols for RS transmission per slot because of, for example, improvement of channel estimation performance. Therefore, in the example where one slot is composed of 7 SC-FDMA symbols, like in the case of FIG. 1, the number of SC-FDMA symbols available for ACK/NACK transmission is 4. By limiting a time interval where the time-domain orthogonal covers are applied, to one slot or shorter, a loss of orthogonality due to a change in wireless channels can be minimized. While length-4 orthogonal covers are applied for 4 SC-FDMA symbols for the ACK/NACK transmission, length-3 orthogonal covers are applied for 3 SC-FDMA symbols for the RS transmission. Basically, the ACK/NACK and RS can be subject to user identification with the cyclic shift values of the Zadoff-Chu sequence, and can undergo additional user identification by means of the orthogonal covers. For coherent reception of ACK/NACK, since there should exist RSs which are associated with ACK/NACK signals on a one-to-one basis, multiplexing capacity of the ACK/NACK signals is restricted by the number of RSs associated with the ACK/NACK signals.

For example, considering a maximum of 6 cyclic shift values per RB, since it is possible to apply different length-3 time-domain orthogonal covers for each cyclic shift of the Zadoff-Chu sequence applied to RSs, it is possible to multiplex RSs from a maximum of 18 different users. Since ACK/NACK signals are mapped to RSs on a one-to-one basis, it is possible to multiplex a maximum of 18 ACK/NACK signals per RB. In this case, there are four length-4 orthogonal covers being applied to ACK/NACK, and 3 of the orthogonal covers are used. The orthogonal covers being applied to ACK/NACK can be predetermined, or can be commonly recognized between UEs and a base station (also known as Node B) by signaling. Therefore, it is possible to increase the multiplexing capacity three times compared with the case where the time-domain orthogonal covers are not used.

FIG. 3 illustrates an example of multiplexing ACK/NACK for each UE with time-domain orthogonal covers in addition to different cyclic shift values of the Zadoff-Chu sequence in the same RB, in the above-stated PUCCH structure for ACK/NACK transmission.

In FIG. 3, the vertical axis represents cyclic shift values 300 of a Zadoff-Chu sequence, and the horizontal axis represents time-domain orthogonal covers 302. The maximum number of cyclic shift values with which multiplexing is possible in one RB without an abrupt loss of orthogonality is 6, and if three length-4 orthogonal covers 364, 366 and 368 are additionally used, it is possible to multiplex a maximum of 6*3=18 ACK/NACK signals.

Shown in FIG. 3 is an example where the same RB and the same Zadoff-Chu sequence are used for the ACK/NACK transmission in such a manner that ACK/NACK 304 from UE #1 is transmitted with a cyclic shift '0' 340 and an orthogonal cover '0' 364; ACK/NACK 306 from UE #2 is transmitted with a cyclic shift '0' 340 and an orthogonal cover '1' 366; ACK/NACK 308 from UE #3 is transmitted with a cyclic shift '0' 340 and an orthogonal cover '2' 368; . . . ; ACK/NACK 304 from UE #16 is transmitted with a cyclic shift '10' 360 and an orthogonal cover '0' 364; ACK/NACK 306 from UE #17 is transmitted with a cyclic shift '10' 360 and an orthogonal cover '1' 366; and ACK/NACK 308 from UE #18 is transmitted with a cyclic shift '10' 360 and an orthogonal cover '2' 368. The orthogonal covers 364, 366 and 368, which are length-4 orthogonal codes, satisfy orthogonality therebetween.

Meanwhile, for an arbitrary UE, in CDM-transmitting CQI or ACK/NACK over PUCCH, CQI and ACK/NACK that the UE desires to transmit may simultaneously occur in some cases. For example, when there is a need to transmit ACK/NACK in response to receipt of downlink data, transmission of CQI may occur.

At this point, the UE should simultaneously transmit the CQI and the ACK/NACK by applying pre-allocated cyclic shift value and orthogonal cover. In this case, multi-code transmission is performed, causing an increase in PAPR.

SUMMARY OF THE INVENTION

An aspect of the present invention is to address at least the problems and/or disadvantages and to provide at least the advantages described below. Accordingly, an aspect of the present invention is to provide a resource allocation apparatus and method for transmission of control information in a mobile communication system.

Another aspect of the present invention is to provide an apparatus and method for allocating resources in simultaneously transmitting CQI and ACK/NACK over the uplink in a mobile communication system.

Further another aspect of the present invention is to provide an apparatus and method for allocating resources in multiplexing multiple control informations before transmission in a mobile communication system.

Yet another aspect of the present invention is to provide an apparatus and method for transmitting/receiving resources to which control information is allocated in a mobile communication system.

According to one aspect of the present invention, there is provided a method for allocating resources in a mobile communication system. The resource allocation method includes determining whether a transmission time of response information indicating presence/absence of an error in received data overlaps a transmission time of channel state information; and when the transmission times overlap each other, allocating, to the response information, a resource block for the channel state information, cyclic shift values in a frequency domain, and orthogonal sequences having orthogonality in a time domain.

According to another aspect of the present invention, there is provided a method for receiving resources in a mobile communication system. The resource reception method includes determining whether a transmission time, at a transmission apparatus, of response information indicating presence/absence of an error in received data overlaps a transmission time, at the transmission apparatus, of channel state information; and upon detecting the overlap between the transmission times, extracting the response information from a received signal, using a resource block for the channel state information, cyclic shift values in a frequency domain, and orthogonal sequences having orthogonality in a time domain.

According to further another aspect of the present invention, there is provided an apparatus for allocating resources in a mobile communication system. The resource allocation apparatus includes a controller for determining whether a transmission time of response information indicating presence/absence of an error in received data overlaps a transmission time of channel state information; and a control channel signal generator for generating, in the response information, a control channel according to a control signal from the controller, using a resource block for the channel state information, cyclic shift values in a frequency domain, and orthogonal sequences having orthogonality in a time domain.

According to yet another aspect of the present invention, there is provided an apparatus for receiving resources in a mobile communication system. The resource reception apparatus includes a controller for determining whether a transmission time, at a transmission apparatus, of response information indicating presence/absence of an error in received data overlaps a transmission time, at the transmission apparatus, of channel state information; and a control channel signal receiver for extracting the response information from a received signal according to a control signal from the controller, using a resource block for the channel state information, cyclic shift values in a frequency domain, and orthogonal sequences having orthogonality in a time domain.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

Although a detailed description of the present invention will be given herein with reference to the LTE system, it would be obvious to those skilled in the art that the operating principle of the present invention is not limited to a particular transmission system that transmits control information over the uplink, but can be applied to all systems for transmitting control information.

In the following description, the present invention provides a transmission/reception operation for a case where multiple control informations, which an arbitrary UE intends to transmit, simultaneously occur, and in particular, provides a resource management scheme for control information. The control information used herein may include (i) Acknowledgement (ACK)/Negative ACK (NACK) feedback information which is a signal used for making a response to a success/failure in reception of received data, (ii) CQI (Channel Quality Indication) information for feeding back the channel state, (iii) MIMO-related feedback information, etc.

More specifically, the present invention provides a wireless resource allocation scheme for reducing PAPR when transmission times of CDM CQI based on cyclic shift values of the Zadoff-Chu sequence overlap transmission times of CDM ACK/NACK based on cyclic shift values of the Zadoff-Chu sequence and orthogonal covers in transmitting control information over PUCCH without uplink data transmission. The operating principle of the present invention can be applied even for transmission of other control information except for the CQI and/or ACK/NACK, for example, MIMO-related feedback control information, etc.

Figure 1:
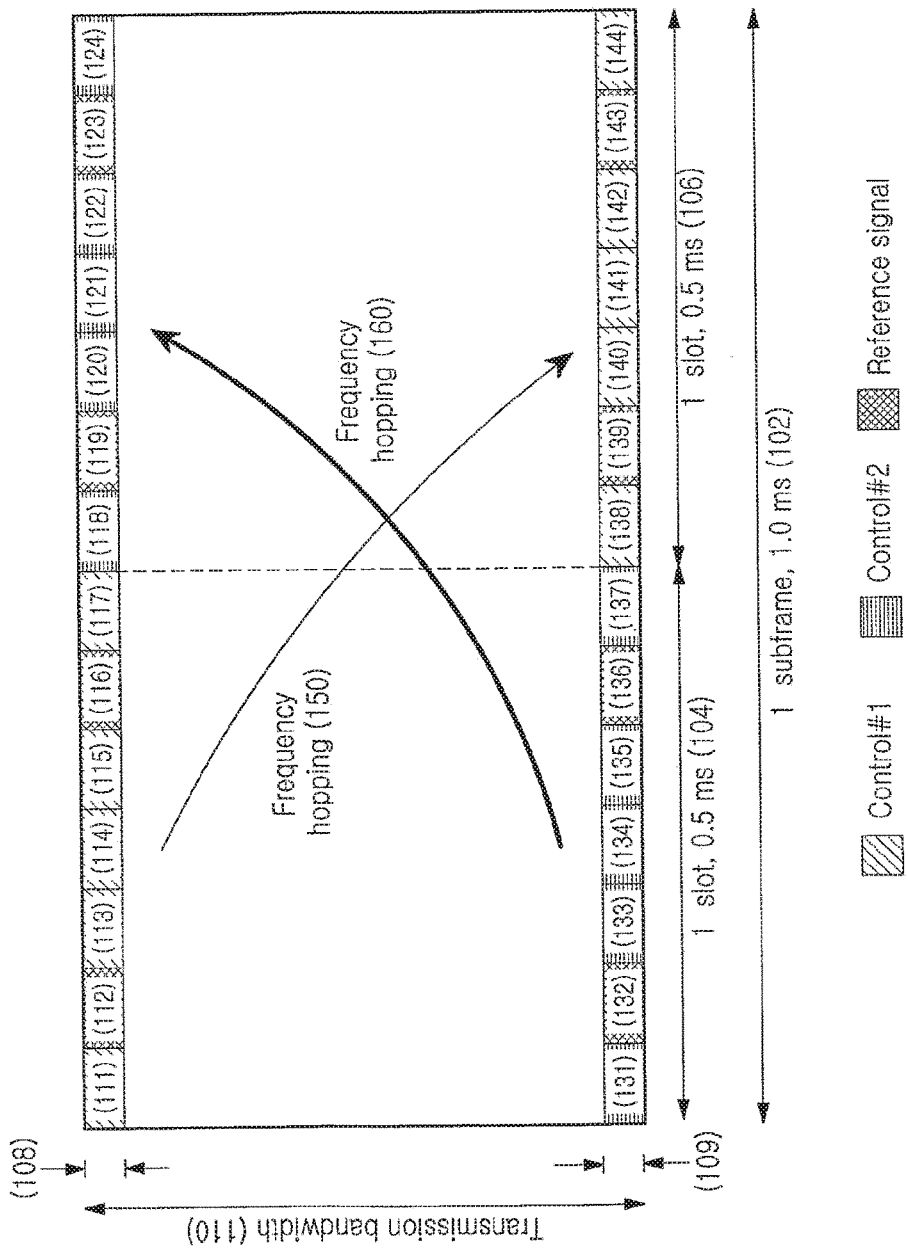
FIG. 1 is a diagram illustrating a transmission structure of control channels in a mobile communication system.
Figure 2:
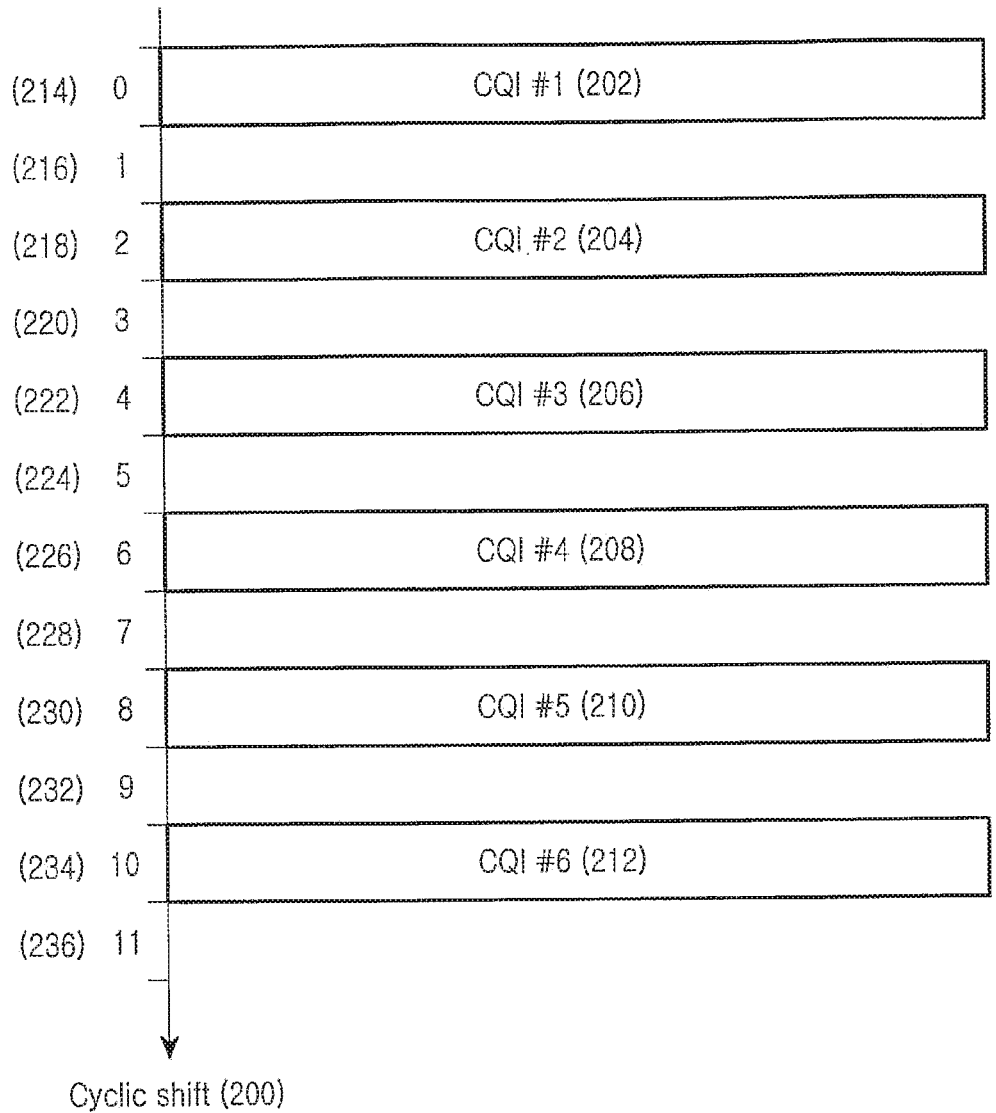
FIG. 2 is a diagram illustrating an example of allocating resources for CQI according to an embodiment of the present invention.
Figure 3:
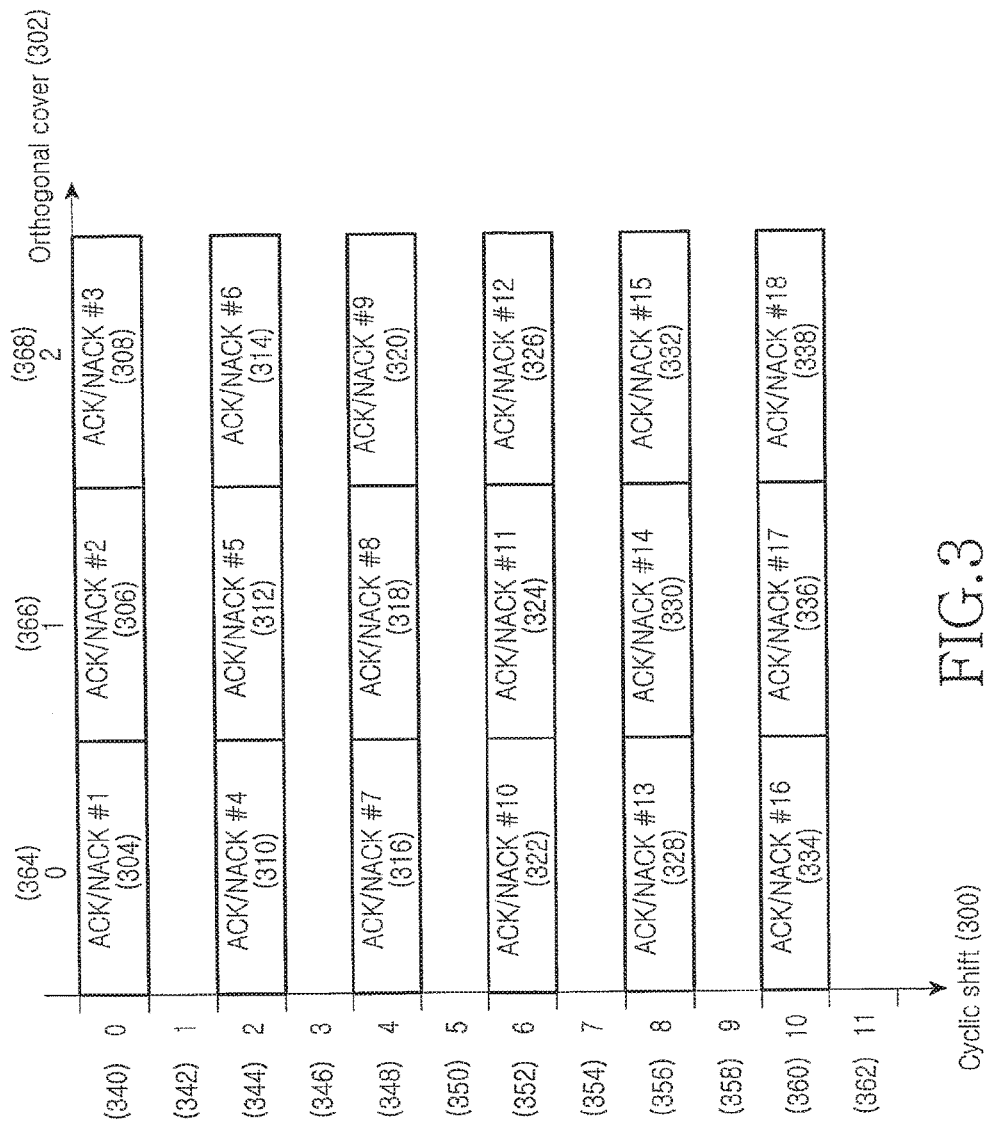
FIG. 3 is a diagram illustrating an example of allocating resources for ACK/NACK according to an embodiment of the present invention.
Figure 4:
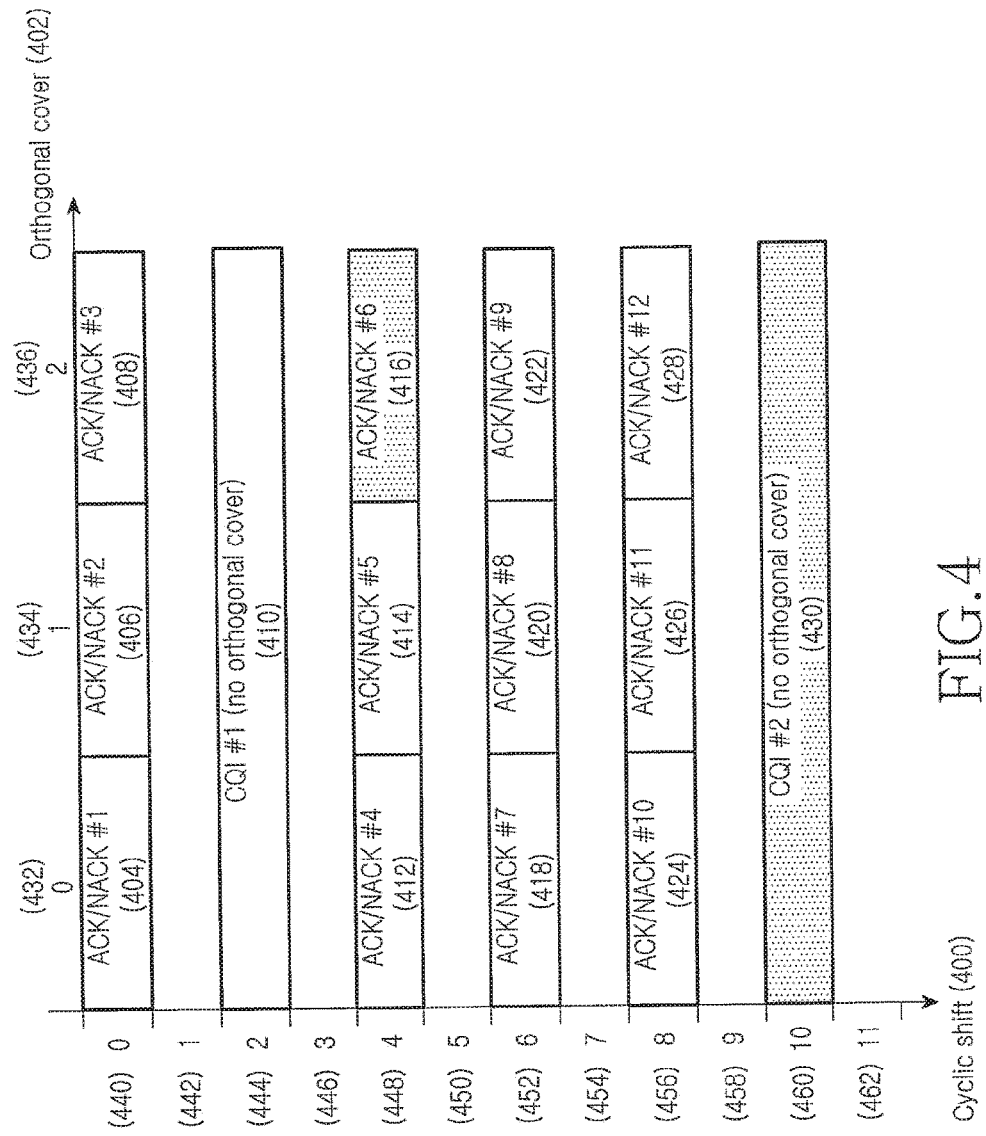
FIG. 4 is a diagram illustrating an example of allocating resources for CQI and ACK/NACK according to an embodiment of the present invention.

FIG. 4 is a diagram illustrating wireless resources for CQI or ACK/NACK allocated in the same RB by a base station for each UE at an arbitrary time.

Referring to FIG. 4, resources for CQI transmission are an RB index and cyclic shift values of a Zadoff-Chu sequence, and resources for ACK/NACK transmission are an RB index, cyclic shift values of the Zadoff-Chu sequence, and time-domain orthogonal covers. In FIG. 4, the vertical axis represents cyclic shift values 400 of the Zadoff-Chu sequence, and the horizontal axis represents time-domain orthogonal covers 402.

The maximum number of cyclic shift values with which multiplexing is possible in one RB without an abrupt loss of orthogonality is 6, and shown in FIG. 4 is an example where the 6 cyclic shifts, i.e., cyclic shift '0' 440, cyclic shift '2' 444, cyclic shift '4' 448, cyclic shift '6' 452, cyclic shift '8' 456 and cyclic shift '10' 460, are used.

For ACK/NACK, which is 1-bit control information, it is possible to increase its multiplexing capacity by applying orthogonal covers thereto. Shown in FIG. 4 is an example of using three length-4 orthogonal covers 432, 434 and 436. A length of the orthogonal covers is proportional to the number of SC-FDMA symbols to which ACK/NACK signals, to which the orthogonal covers are applied, are mapped, and the orthogonal covers are preferably applied to SC-FDMA symbols within one slot so that a loss of orthogonality caused by a change in wireless channels can be minimized. The number of orthogonal covers is proportional to the number of orthogonal covers being applied to RSs for coherent demodulation of the ACK/NACK.

For convenience' sake, it is assumed in FIG. 4 that resources for the ACK/NACK or CQI transmission are all allocated to different UEs. In this example, however, resources for transmission of ACK/NACK #6 416 and CQI #2 430 are allocated to the same UE #1. Regarding the resources for ACK/NACK transmission, it is possible to estimate the resources under a previous agreement based on the data channel the base station transmits to the UE or its associated control channel, or the base station can explicitly provide information on the resources to the UE by signaling. Regarding the resources for CQI transmission, the resources are determined in a semi-static manner so that CQI can be transmitted every predetermined period, or the base station sets the resources when necessary and provides information thereon to the UE.

In the example of FIG. 4, in the state where the UE #1 is allocated RB #0 and a cyclic shift '10' 460 as resources for transmission of CQI #2 430 at an arbitrary time as previously agreed upon, there occurs a need to transmit ACK/NACK #6 416 for making a response to a success/failure in reception of the data received from the base station at the same time as that of the CQI transmission. It is indicated that the resources for transmission of the ACK/NACK #6 416 are RB #0, cyclic shift '4' 448, and orthogonal cover '2' 436.

In this case, for the UE #1, transmitting the CQI and ACK/NACK at the same time, i.e., multi-code transmission, which may cause an increase in PAPR, is not preferable. Therefore, the UE #1 should give a priority to any one of the CQI transmission and the ACK/NACK transmission, and in terms of system throughput, it is considered to give a higher priority to ACK/NACK transmission. That is, when transmission times of ACK/NACK and CQI overlap each other, the UE #1 transmits only the ACK/NACK, omitting CQI transmission at the corresponding time. According to the present invention, in the above-stated situation, the UE can use the resources previously allocated for CQI transmission as the resources for ACK/NACK transmission.

The reason is as follows. The time-domain orthogonal covers have a characteristic that their orthogonality is maintained when a change in wireless channels is insignificant during the time interval where the orthogonal covers are applied. However, when there is an abrupt channel change as the UE moves at high speed, the ACK/NACK signal of the UE suffers a loss of orthogonality, causing performance degradation. In addition, when there is a significant difference between channel changes that the ACK/NACK signals suffer, which are multiplexed after orthogonal covers are applied thereto, interference between the ACK/NACK signals may increase, causing performance degradation.

In the example of FIG. 4, the resources for transmission of the ACK/NACK #6 416 allocated to the UE #1 are allocated so that they share the same RB #0 and the same cyclic shift '4' 448 with the resources for transmission of ACK/NACK #4 412 and ACK/NACK #5 414 allocated to another UE. In this case, the ACK/NACK #4 412, ACK/NACK #5 414 and ACK/NACK #6 416 can be identified using different orthogonal covers 432, 434 and 436. If there is an abrupt change in wireless channels that the ACK/NACK #4 412, ACK/NACK #5 414 and ACK/NACK #6 416 experience, which are transmitted using the allocated resources, interference may occur between ACK/NACK signals due to a loss of orthogonality between the orthogonal covers, causing performance degradation. Therefore, when the UE #1 is simultaneously allocated resources for transmission of the ACK/NACK #6 416 and resources for transmission of the CQI #2 430 at an arbitrary time, the UE #1 transmits the ACK/NACK using the resources allocated for CQI transmission, omitting CQI transmission. In this case, only one type of control information is allocated for one cyclic shift in the resources for CQI transmission, contributing to a reduction in interference between ACK/NACK signals from several UEs. This is a preferable scheme for reducing performance degradation between ACK/NACK signals when the UE is located in the situation where the change in wireless channels is significant, like in the fast moving environment.

A description will now be made of detailed embodiments to which the operating principle of the present invention is applied.

First Embodiment

A first embodiment provides a detailed transmission/reception operation and apparatus for the case where a UE transmits ACK/NACK and CQI as control information in a mobile communication system supporting an uplink service.

Figure 5:
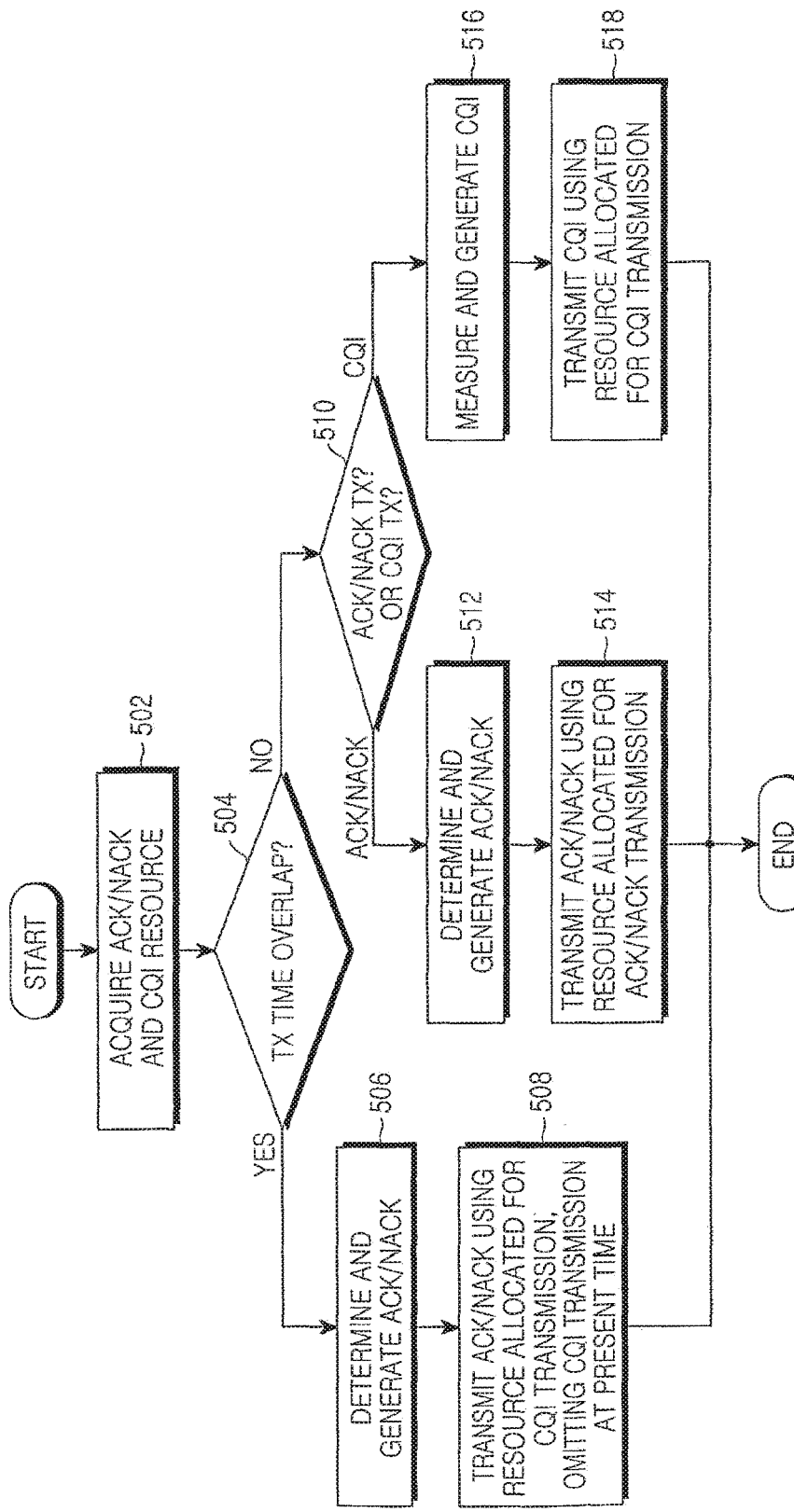
FIG. 5 is a diagram illustrating a control information transmission procedure of a transmission side according to a first embodiment of the present invention.

FIG. 5 illustrates a control information transmission procedure of a transmission side according to the first embodiment of the present invention. As the system supports an uplink service, the transmission side is a UE, and for convenience' sake, it is assumed herein that the UE transmits at least one of the above-stated control information, and transmits no data. The UE transmits the control information over a physical channel PUCCH defined by resources such as RB, cyclic shift values of a Zadoff-Chu sequence, and orthogonal covers, all of which are allocated from the base station. When simultaneously transmitting data and control information, the UE Time Division Multiplexing (TDM)-multiplex the data and the control information, and maps the data to time-frequency resources allocated for data transmission.

Referring to FIG. 5, in step 502, the UE acquires resources for transmission of ACK/NACK and CQI from the base station. The resources for ACK/NACK transmission are RB information, cyclic shift values of the Zadoff-Chu sequence, and time-domain orthogonal covers, and resources for transmission of CQI are RB information and cyclic shift values of the Zadoff-Chu sequence.

As to the resources for ACK/NACK transmission, the UE can estimate the resources under a previous agreement based on the data channel the base station transmits to the UE or its associated control channel, or the base station can explicitly provide information on the resources to the UE by signaling. The resources for ACK/NACK transmission are dynamically allocated according to the presence/absence of the data the base station transmits to each UE. That is, when the base station transmits no data to the UE, the resources for ACK/NACK transmission may not be allocated. The resources for CQI transmission is determined in a semi-static manner so that CQI can be transmitted every predetermined period, or the base station sets the resources when necessary and provides information thereon to the UE. Therefore, the resources for CQI transmission are characterized in that they remain unchanged for a time longer than that of the resources for ACK/NACK transmission.

In the first embodiment, it will be assumed that when transmission times of ACK/NACK overlap transmission times of CQI, the RB allocated for ACK/NACK transmission is equal to the RB allocated for CQI transmission. However, even though the RB allocated for ACK/NACK transmission is not equal to the RB allocated for CQI transmission, the basic operation of the present invention is not restricted.

In step 504, the UE determines whether transmission times of the ACK/NACK and CQI overlap each other. The transmission time of the ACK/NACK can be defined as the time a predetermined decoding processing time has elapsed after the UE received data from the base station if any.

If the transmission times of the ACK/NACK and CQI overlap each other, the UE proceeds to step 506 where it performs ACK/NACK information transmission procedure, omitting CQI transmission. In step 506, the UE determines the presence/absence of an error by decoding the data received from the base station, generates ACK in the absence of an error, and generates NACK in the presence of an error. Thereafter, in step 508, the UE transmits the generated ACK/NACK using the resources pre-allocated for CQI transmission. At the present time, the UE omits CQI transmission.

In other words, upon detecting the overlap between the transmission times of ACK/NACK and CQI, the UE transmits an ACK/NACK signal for the received data through the CQI resource that uses one cyclic shift. As a result, a reception side can prevent an increase in PAPR between multiple UEs that suffer from the multi-code transmission problem that the control information is transmitted after orthogonal covers are applied thereto, and maximally ensures the ACK/NACK signal transmitted from the UE.

However, if it is determined in step 504 that the transmission times of the ACK/NACK and CQI do not overlap, the UE determines in step 510 whether it will perform ACK/NACK transmission or will perform CQI transmission. If the UE determines to make ACK/NACK transmission in step 510, the UE determines in step 512 the presence/absence of an error by decoding the data received from the base station, generates ACK in the absence of an error, and generates NACK in the presence of an error. Thereafter, in step 514, the UE transmits the generated ACK/NACK using the resources allocated for ACK/NACK transmission. However, if the UE determines to make CQI transmission in step 510, the UE measures the channel state from the RS received from the base station, and generates CQI according to a predefined format, in step 516. Thereafter, in step 518, the UE transmits the generated CQI using the resources allocated for CQI transmission.

Figure 6:
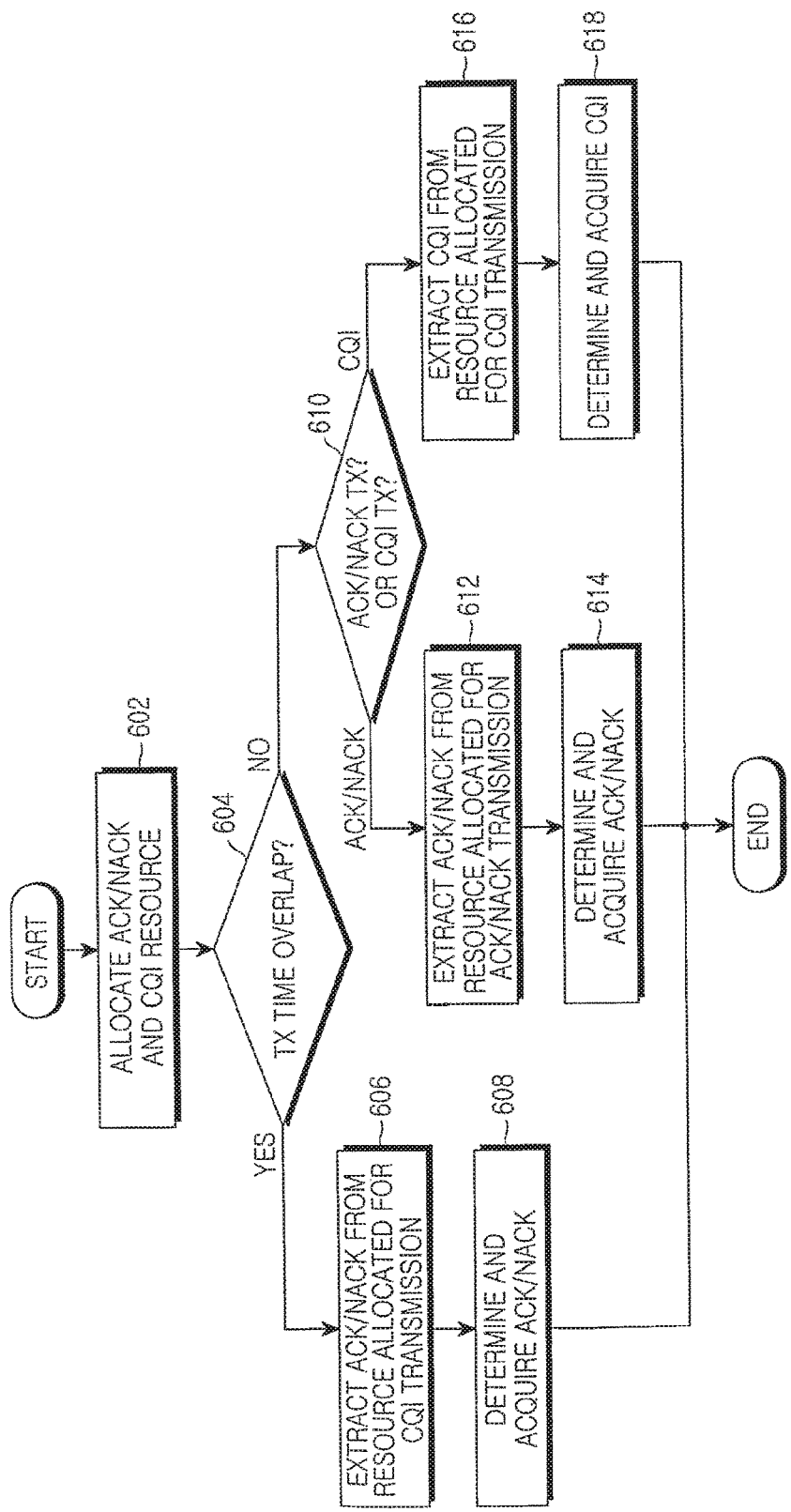
FIG. 6 is a diagram illustrating a control information reception procedure of a reception side according to the first embodiment of the present invention.

FIG. 6 illustrates a control information reception procedure of a reception side according to the first embodiment of the present invention. Herein, as the system supports the uplink service, the reception side is a base station, and the base station receives, from a UE, control information such as ACK/NACK for the previously transmitted downlink data, or the current CQI.

Referring to FIG. 6, in step 602, the base station allocates resources for transmission of ACK/NACK and CQI to each of the UEs under its control, and transmits the resource allocation information thereto. The resources for ACK/NACK transmission are RB information, cyclic shift values of the Zadoff-Chu sequence, and time-domain orthogonal covers, and the resources for CQI transmission are RB information and cyclic shift values of the Zadoff-Chu sequence. As to the resources for ACK/NACK transmission, the UE can estimate the resources under a previous agreement based on the data channel the base station transmits to the UE or its associated control channel, or the base station can explicitly provide information on the resources to the UE by signaling. Therefore, the resources for ACK/NACK transmission can be dynamically allocated according to the presence/absence of the data the base station transmits to each UE. That is, when the base station transmits no data to the UE, the resources for ACK/NACK transmission may not be allocated. The resources for CQI transmission is determined in a semi-static manner so that CQI can be transmitted every predetermined period, or the base station sets the resources when necessary and provides information thereon to the UE. Therefore, the resources for CQI transmission remain unchanged for a time longer than that of the resources for ACK/NACK transmission.

In step 604, the base station determines whether the UE's transmission times of the ACK/NACK and CQI, that the base station desires to receive from a particular UE, overlap each other. The UE's transmission time of ACK/NACK can be defined as the time a predetermined decoding processing time has elapsed after the UE received data from the base station if any. Therefore, the base station can estimate the ACK/NACK transmission time of the UE, and as the CQI is periodically transmitted, the base station can determine whether the CQI transmission time and the ACK/NACK transmission time overlap each other.

Upon detecting the overlap between the CQI transmission time and the ACK/NACK transmission time, the base station proceeds to step 606 where it extracts ACK/NACK for the previously transmitted downlink data from the resources allocated for CQI transmission, recognizing that UE has transmitted ACK/NACK using the CQI resources, omitting CQI transmission. In step 608, the base station decodes the extracted ACK/NACK to determine whether the UE has received data without error. Based on the decision on the data reception, the base station can determine whether it should perform retransmission on the data.

However, upon detecting the non-overlap between UE's transmission times of ACK/NACK and CQI in step 604, the base station determines in step 610 whether ACK/NACK transmission has been made or CQI transmission has been made. After transmitting downlink data, if the base station allocated resources for ACK/NACK transmission to the UE and has received a control signal through the resources after a lapse of a predetermined time, the base station determines the received control signal as ACK/NACK. On the other hand, after allocating the resources for CQI transmission to the UE, if the base station has received a control signal through the resources according to a predetermined CQI transmission period of the UE, the base station determines the received control signal as CQI.

Upon detecting the receipt of ACK/NACK in step 610, the base station extracts ACK/NACK from the resources allocated to the UE for ACK/NACK transmission in step 612. In step 614, the base station decodes the extracted ACK/NACK, to determine whether the UE has received data without error. However, upon detecting the receipt of CQI in step 610, the base station extracts CQI from the resources allocated to the UE for CQI transmission in step 616. In step 618, the base station decodes the extracted CQI, to determine and acquire the state of the channel environment where the UE is currently located.

Figure 7A:
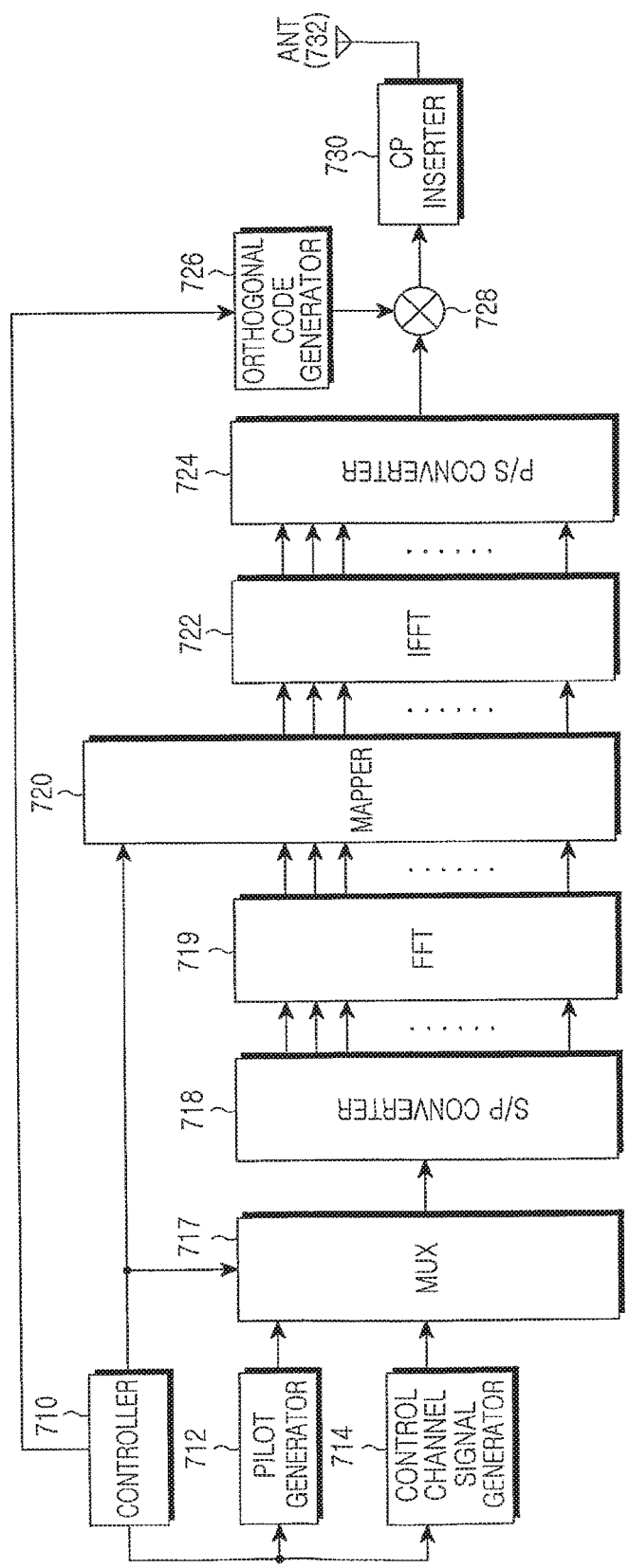
FIGS. 7A and 7B are diagrams illustrating a structure of a transmission apparatus according to an embodiment of the present invention.
Figure 7B:
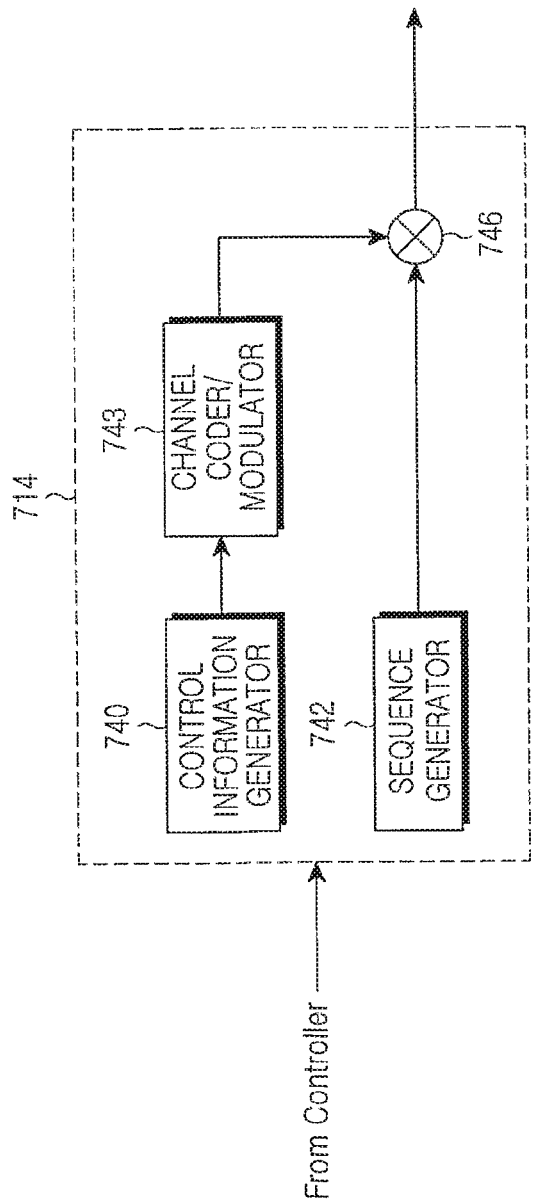

FIGS. 7A and 7B illustrate a structure of a transmission apparatus according to an embodiment of the present invention.

Referring to FIG. 7A, the transmission apparatus includes a controller 710, a pilot generator 712, a control channel signal generator 714, a multiplexer 717, a Serial-to-Parallel (S/P) converter 718, a Fast Fourier Transform (FFT) block 719, a mapper 720, an Inverse Fast Fourier Transform (IFFT) block 722, a Parallel-to-Serial (P/S) converter 724, an orthogonal code generator 726, a multiplier 728, a CP (Cyclic Prefix) inserter 730, and an antenna 732.

The controller 710, a device for controlling the overall operation of the transmission apparatus, generates control signals needed in blocks such as the pilot generator 712, control channel signal generator 714, multiplexer 717, mapper 720 and orthogonal code generator 726.

For example, a control signal being input to the pilot generator 712 indicates sequence index and time-domain cyclic shift information for generation of a Zadoff-Chu sequence used for an allocated pilot. The control channel signal generator 714 is provided with decision information used for determining whether the desired transmission control information is ACK/NACK or CQI, and with information such as a length of the Zadoff-Chu sequence applied to the control information, a sequence index, and a cyclic shift value.

The multiplexer 717 maps (multiplexes) the pilot and control information generated respectively by the pilot generator 712 and the control channel signal generator 714, to SC-FDMA symbols in the predetermined positions according to the timing information indicated by the control signal provided from the controller 710. The output signal of the multiplexer 717 is input to the FFT 719 after converted into a parallel signal in the S/P converter 718. The FFT 719 converts the input signal into a frequency-domain signal.

Receiving frequency allocation information for pilots or control channels from the controller 710, the mapper 720 maps the input frequency-domain signals to the allocated frequency resources. The frequency allocation information for control channels indicates to which RB the corresponding control channel is mapped before its transmission. The output signal of the mapper 720 is converted into a time-domain signal in the IFFT 722, and then input to the P/S converter 724 where it is converted into a serial signal.

Receiving from the controller 710 the information indicating whether the signal the UE intends to transmit is ACK/NACK and a pilot for ACK/NACK transmission, the orthogonal code generator 726 generates orthogonal codes corresponding to each case. Also, receiving timing information from the controller 710, the orthogonal code generator 726 applies each chip of the orthogonal codes to control channel signals being mapped to the SC-FDMA symbols separately for each SC-FDMA symbol. The information indicating which orthogonal code it will use is defined under an agreement, or is provided to the UE through base station signaling. By limiting the time interval where the orthogonal codes are applied, to one slot or shorter, a loss of orthogonality due to a change in wireless channels can be minimized.

For example, in the system where one slot is composed of 7 SC-FDMA symbols, and among them, 4 SC-FDMA symbols are used for ACK/NACK transmission and 3 SC-FDMA symbol are used for pilot transmission, a length of the orthogonal codes applied to the ACK/NACK is 4, and a length of the orthogonal codes applied to the pilots for ACK/NACK transmission is 3. Therefore, the orthogonal code generator 726, receiving the timing information from the controller 710, generates orthogonal codes it will apply for each slot in one subframe where ACK/NACK or pilots for ACK/NACK transmission are transmitted. The orthogonal codes applied to each slot can be either equal to each other, or different from each other. When the signal that the UE intends to transmit is not ACK/NACK and pilots for ACK/NACK transmission, the orthogonal code generator 726 is disabled.

That is, when the signal that the UE intends to transmit is ACK/NACK and pilots for ACK/NACK transmission, each chip of the orthogonal codes generated by the orthogonal code generator 726 is multiplied by each SC-FDMA symbol to which ACK/NACK is mapped, or by each SC-FDMA symbol to which a pilot for ACK/NACK transmission is mapped. This multiplication process is achieved in the multiplier 728. If the signal that the UE intends to transmit is not ACK/NACK and pilots for ACK/NACK transmission, the serial signal is directly input to the CP inserter 730. The CP inserter 730 inserts a CP for prevention of inter-symbol interference into the input signal for each symbol, and transmits the CP-inserted signal via the transmit antenna 732.

FIG. 7B is a block diagram illustrating a control channel signal generator according to an embodiment of the present invention.

Referring to FIG. 7B, the control channel signal generator 714 generates control information according to a control signal provided from a controller, and includes a control information generator 740, a channel coder/modulator 743, a sequence generator 742, and a multiplier 746.

The sequence generator 742 generates a Zadoff-Chu sequence to be applied in units of SC-FDMA symbols. In this case, for sequence generation, the sequence generator 742 receives information such as sequence length, sequence index and cyclic shift value from the controller 710. The sequence information is information which is commonly generated in the base station and the UE, and is mutually recognizable.

If the ACK/NACK transmission time and the CQI transmission time overlap each other, the controller 710 orders the control channel signal generator 714 to generate and send ACK/NACK. In this case, the controller 710 instructs the control channel signal generator 714 to use a value allocated for CQI transmission, i.e., one cyclic shift value, as a cyclic shift value to be applied. However, if the ACK/NACK transmission time and the CQI transmission time do not overlap, the cyclic shift values allocated for ACK/NACK transmission are used for ACK/NACK transmission, and the cyclic shift values allocated for CQI transmission are used for CQI transmission.

When the control information the UE intends to transmit is ACK/NACK, the control information generator 740 generates ACK/NACK by determining the presence/absence of an error in the received data, and the channel coder/modulator 743 generates modulation symbols by performing channel coding through repetition and then performing modulation on the generated ACK/NACK. Thereafter, the multiplier 746 multiplies each of the generated modulation symbols by each sample of the generated Zadoff-Chu sequence, thereby generating an ACK/NACK control channel.

On the other hand, when the control information the UE intends to transmit is CQI, the control information generator 740 generates CQI by measuring the channel state from the received pilot, and the channel coder/modulator 743 generates modulation symbols by performing channel coding through block coding or convolutional coding and then performing modulation on the generated CQI. Thereafter, the multiplier 746 multiplies each of the generated modulation symbols by each sample of the generated Zadoff-Chu sequence, thereby generating a CQI control channel.

Figure 8A:
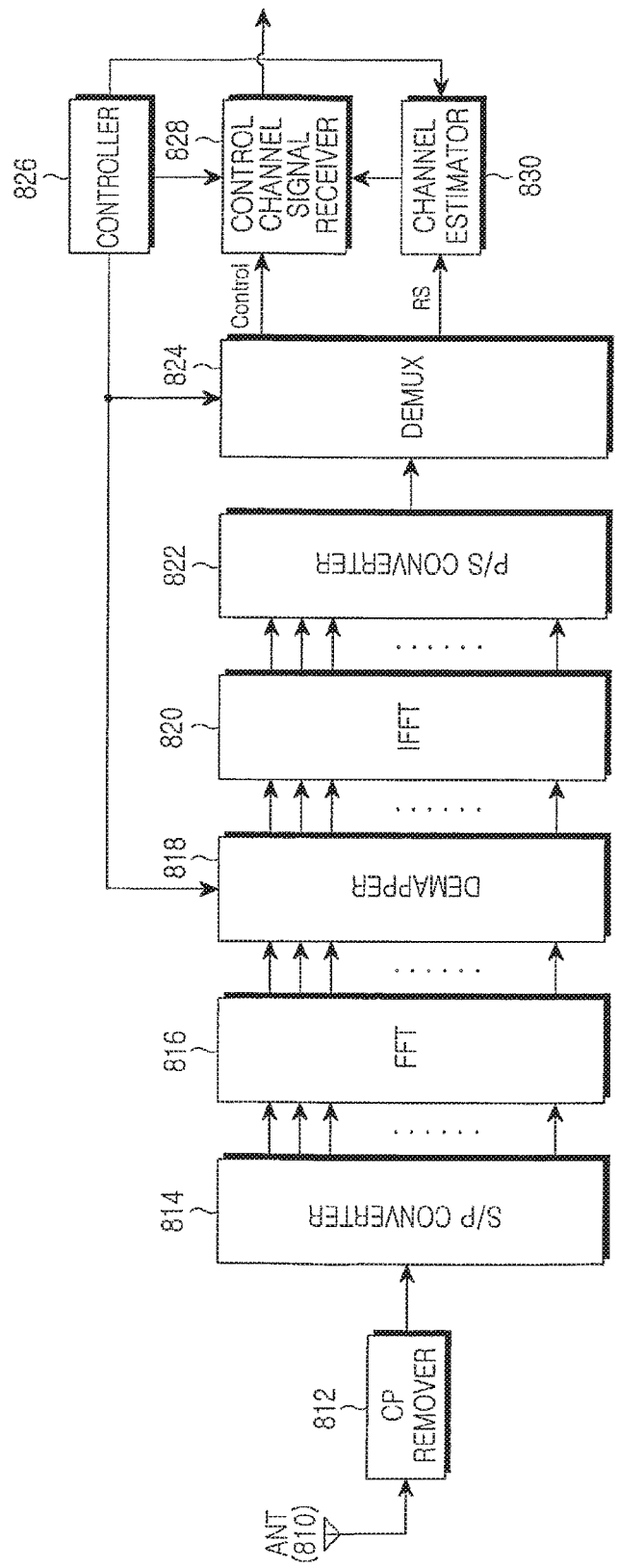
FIGS. 8A and 8B are diagrams illustrating a structure of a reception apparatus according to an embodiment of the present invention.
Figure 8B:
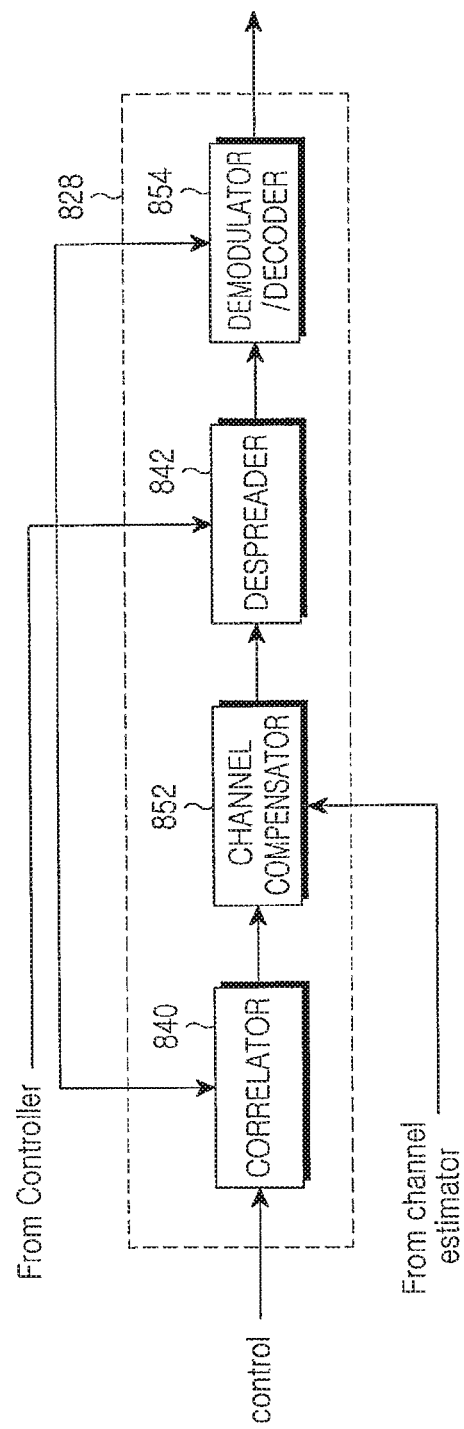

FIGS. 8A and 8B illustrate a structure of a reception apparatus for receiving control information according to an embodiment of the present invention.

Referring to FIG. 8A, the reception apparatus includes an antenna 810, a CP remover 812, an S/P converter 814, an FFT block 816, a demapper 818, an IFFT block 820, a P/S converter 822, a demultiplexer 824, a controller 826, a control channel signal receiver 828, and a channel estimator 830.

The controller 826, a device for controlling the overall operation of the reception apparatus, generates/transmits control signals needed in major blocks such as the demultiplexer 824, demapper 818, control channel signal receiver 828 and channel estimator 830.

The control channel signal receiver 828 is provided with various control signals related to uplink control information. The control signal being input to the channel estimator 830 indicates sequence index, time-domain cyclic shift information and orthogonal code information used for generation of a pilot sequence allocated to the UE that intends to receive it. Based on timing information provided from the controller 826, the demultiplexer 824 classifies (demultiplexes) the signal from the P/S converter 822 into a control channel signal being input to the control channel signal receiver 828 and a pilot being input to the channel estimator 830. The demapper 818, receiving frequency allocation information for control channel signals or pilots from the controller 826, extracts the control channel signal or pilot from the actual frequency resources to which the control channel signal or pilot are mapped.

Upon receipt of ACK/NACK or CQI from the UE via the antenna 810, the base station removes a CP included in the received signal by means of the CP remover 812, and the CP-removed signal is converted into a parallel signal by the S/P converter 814 and then input to the FFT block 816. The FFT block 816 converts the input signal into a frequency-domain signal, and outputs it to the demapper 818. The demapper 818, receiving frequency allocation information for pilots or control channels from the controller 826, demaps frequency-domain pilots and control channel signals from the particular frequency resources. The IFFT block 820 converts the frequency-domain signal from the demapper 818 into a time-domain signal. The output signal of the IFFT block 820 is converted into a serial signal in the P/S converter 822, and the demultiplexer 824 classifies the input signal into control channel signals and pilots. The classified control channel signals and pilots are input to the control channel signal receiver 828 and the channel estimator 830, respectively. The channel estimator 830 acquires a channel estimate from the input pilot signal, and provides the channel estimate to the control channel signal receiver 828, for channel compensation of the control channel signal. The control channel signal receiver 828 channel-compensates the control signal received from the demultiplexer 824 depending on the channel estimate, and then acquires control information therefrom.

FIG. 8B is a block diagram illustrating a control channel signal receiver according to an embodiment of the present invention.

Referring to FIG. 8B, the control channel signal receiver 828 includes a correlator 840, a channel compensator 852, a despreader 842, and a demodulator/decoder 854.

The correlator 840 performs a correlation operation with the input received signal according to the sequence information provided from the controller 826. Herein, the sequence information used for generating a sequence is information which is commonly generated in the base station and the UE, and is mutually recognizable. The base station performs correlation using information such as sequence length, sequence index and cyclic shift, all of which are equal to those of the UE.

The base station can determine whether UE's transmission times of ACK/NACK overlap UE's transmission times of CQI. Upon detecting the overlap between the UE's transmission times of ACK/NACK and the UE's transmission times of CQI, the controller 826 indicates that the control information received at the correlator 840 is ACK/NACK, and instructs the UE to use the cyclic shift values allocated for CQI transmission as cyclic shift values to be applied. If the UE's transmission times of ACK/NACK do not overlap the UE's transmission times of CQI, the cyclic shift values allocated for ACK/NACK transmission are used for ACK/NACK reception, and the cyclic shift values allocated for CQI transmission are used for CQI reception.

The channel compensator 852 performs channel compensation using a channel estimate provided from the channel estimator 830. The despreader 842 receives, from the controller 826, information indicating whether the received control channel signal is ACK/NACK. If the received control channel signal is ACK/NACK, the despreader 842 performs a despreading operation on the input signal using orthogonal codes predetermined for ACK/NACK transmission of the UE. The despreading operation is achieved by multiplying each chip of the orthogonal codes by SC-FDMA symbols to which ACK/NACK is mapped. The despreader 842, receiving timing information from the controller 826, generates orthogonal codes to be applied for each slot in one subframe where ACK/NACK is received, and performs despreading thereon. The orthogonal codes applied to ACK/NACK mapped to each slot can be either equal to each other, or different from each other. When the received control channel signal is not ACK/NACK, the despreader 842 is disabled.

Upon receiving from the controller 826 the information indicating whether the received control channel signal is ACK/NACK or CQI, the demodulator/decoder 854 for performing a demodulation and decoding operation performs demodulation the input signal from the despreader 842 if the received control channel signal is ACK/NACK, and then performs accumulation thereon as many times as the number of repetitions made on ACK/NACK at the transmission side, to determine ACK/NACK. However, if the received control channel signal is CQI, the demodulator/decoder 854 performs demodulation on the input signal from the channel compensator 852, and then performs channel decoding corresponding to the CQI to determine CQI.

Second Embodiment

A second embodiment provides an operation and apparatus for performing joint coding-based transmission/reception when a UE transmits ACK/NACK and CQI as control information in a mobile communication system supporting an uplink service.

Figure 9:
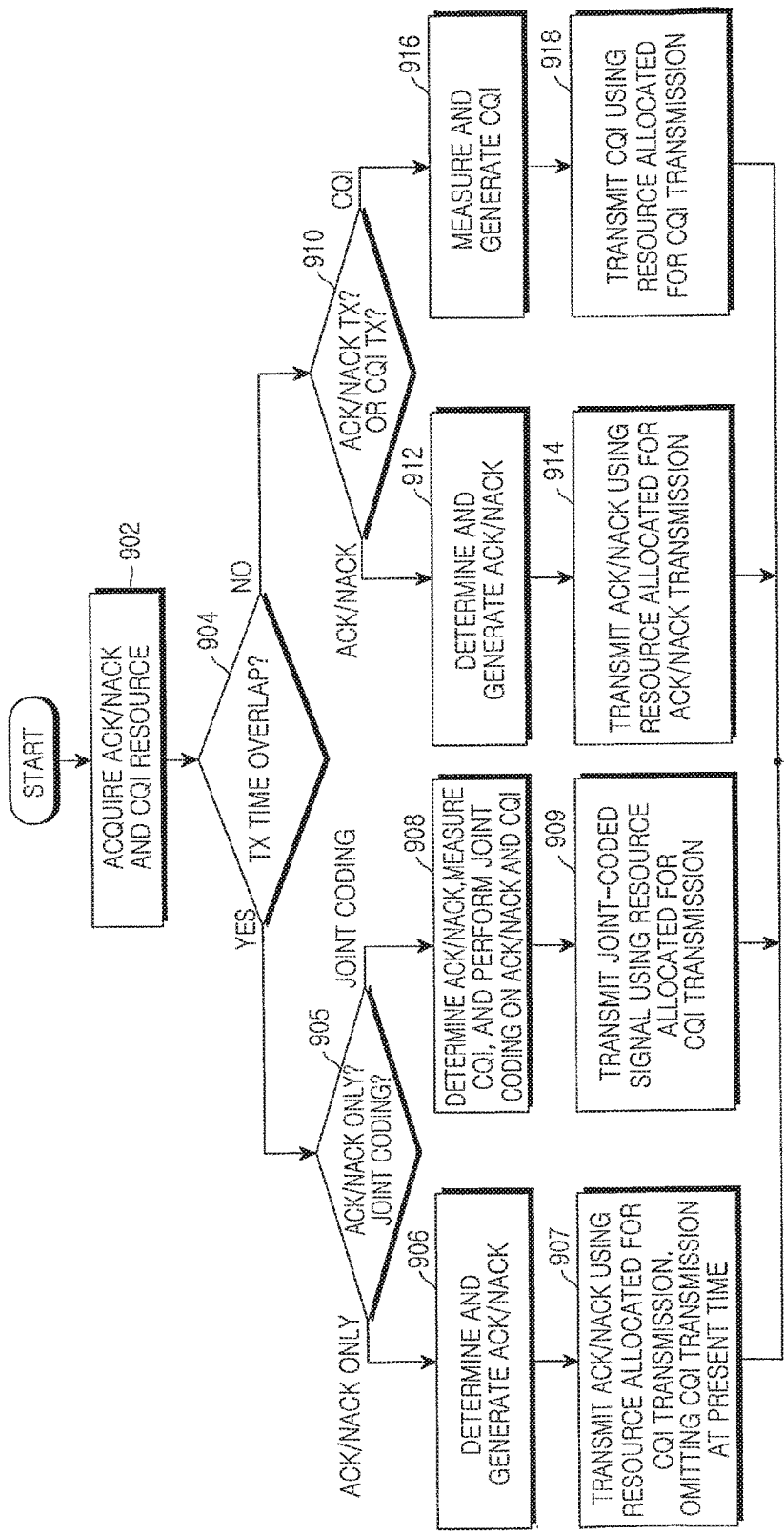
FIG. 9 is a diagram illustrating a control information transmission procedure of a transmission side according to a second embodiment of the present invention.

FIG. 9 illustrates a control information transmission procedure of a transmission side according to the second embodiment of the present invention.

Referring to FIG. 9, in step 902, a UE acquires resources for transmission of ACK/NACK and CQI from a base station. The UE determines in step 904 whether it should transmit ACK/NACK and CQI at the same transmission time. That is, the UE determines whether transmission times of ACK/NACK and CQI overlap each other. The transmission time of ACK/NACK can be defined as the time a predetermined decoding processing time has elapsed after the UE received downlink data from the base station if any.

If the base station transmits no data to the UE, the ACK/NACK transmission of the UE never happens. The CQI is transmitted every predetermined CQI transmission period.

If the transmission times of ACK/NACK and CQI overlap each other, the UE proceeds to step 905 where the UE determines whether it will transmit only ACK/NACK, omitting CQI transmission; it will transmit CQI and ACK/NACK after joint coding; or it will TDM-multiplex CQI and ACK/NACK after separate coding.

For example, when the base station expects a received Signal to Noise Ratio (SNR) higher than or equal to a predetermined threshold as the UE is located in the vicinity of the base station, the UE can be set to joint-code CQI and ACK/NACK, or to TDM-multiplex CQI and ACK/NACK after separate coding. Also, when the base station determines that there is a need for reception of both ACK/NACK and CQI in a particular situation, it can set the UE to joint-code CQI and ACK/NACK, or to TDM-multiplex CQI and ACK/NACK after separate coding.

However, when the UE is located in the cell boundary as it is far from the base station, performing the joint coding or performing the TDM transmission after separate coding may not satisfy the predetermined required reception reliability. In this case, the UE can be set to transmit only ACK/NACK, omitting CQI transmission. Also, when the base station determines that there is no need for reception of ACK/NACK and CQI in a particular situation, the UE can be set to transmit only ACK/NACK, omitting CQI transmission.

Therefore, whether the UE will transmit only ACK/NACK, omitting CQI transmission; whether the UE will transmit CQI and ACK/NACK after joint coding; or whether the UE will TDM-multiplex CQI and ACK/NACK after separate coding, can be determined under an agreement previously made between the base station and the UE, or can be notified to the UE by the base station through signaling.

If the UE determines to transmit only ACK/NACK in step 905, the UE proceeds to step 906 where it decodes the data received from the base station to determine the presence/absence of an error. The UE generates ACK in the absence of an error, and generates NACK in the presence of an error. Thereafter, in step 907, the UE transmits the generated ACK/NACK using resources pre-allocated for CQI transmission. That is, the UE omits CQI transmission at the present transmission time.

However, if the UE determines to joint-code CQI and ACK/NACK or to TDM-transmit CQI and ACK/NACK after separate coding in step 905, the UE proceeds to step 908 where it determines the presence/absence of an error in the received data. The UE generates ACK in the absence of an error, and generates NACK in the presence of an error. In addition, the UE measures the channel state from RSs received from the base station, and generates CQI according to a predefined format. The UE joint-codes the generated ACK/NACK and CQI, or TDM-multiplex the generated ACK/NACK and CQI after separate coding. In step 909, the UE transmits the joint-coded or TDM-multiplexed signals using resources allocated for CQI transmission. The term 'joint coding' as used herein refers to the following operation. For example, let's assume that 5 bits are allocated to express CQI. In this case, of the 5 bits, 1 bit in a particular position is used as ACK/NACK and the remaining 4 bits are used as CQI bits. Therefore, the 5 bits are jointed bits of ACK/NACK and CQI, and the jointed bits are coded according to a predetermined coding scheme. This is called 'joint coding'.

If the transmission times of ACK/NACK and CQI do not overlap in step 904, the UE proceeds to step 910 where the UE determines whether it will make ACK/NACK transmission or CQI transmission. If the UE determines to make ACK/NACK transmission, the UE determines the presence/absence of an error in the received data in step 912. The UE generates ACK in the absence of an error, and generates NACK in the presence of an error. Thereafter, in step 914, the UE transmits the generated ACK/NACK using resources allocated for ACK/NACK transmission. However, if the UE determines to perform CQI transmission in step 910, the UE measures the channel state from RSs received from the base station and generates CQI in step 916. In step 918, the generated CQI is transmitted using resources allocated for CQI transmission.

Figure 10:
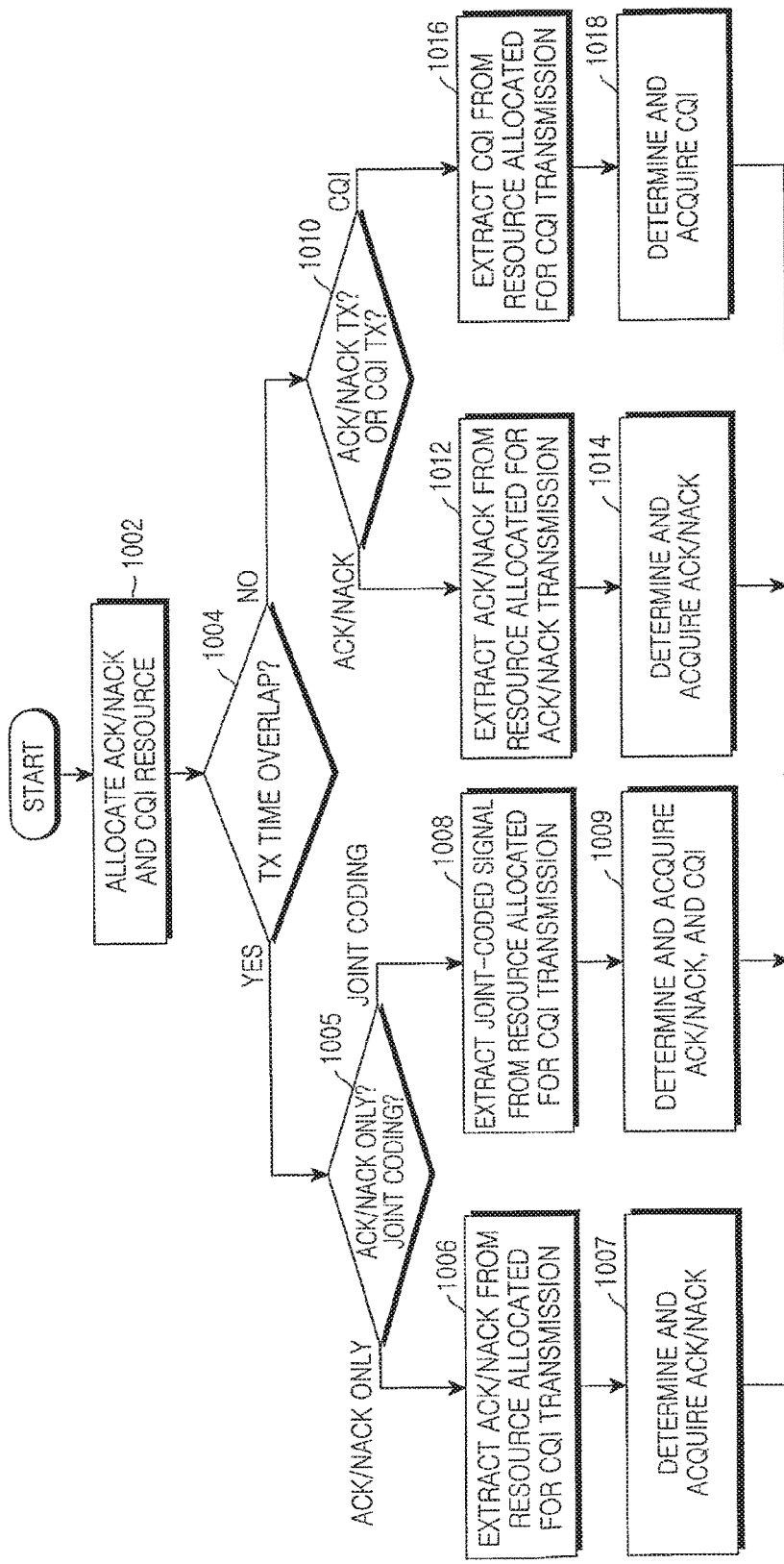
FIG. 10 is a diagram illustrating a control information reception procedure of a reception side according to the second embodiment of the present invention.

FIG. 10 illustrates a control information reception procedure of a reception side according to the second embodiment of the present invention.

Referring to FIG. 10, in step 1002, a base station allocates resources for transmission of ACK/NACK and CQI to each of a plurality of UEs under its control.

The base station determines in step 1004 whether UE's transmission times of ACK/NACK and CQI, that it intends to receive from a particular UE, overlap each other. The UE's transmission time of ACK/NACK can be defined as the time a predetermined decoding processing time has elapsed after the UE received data from the base station if any. If the base station transmits no data to the UE, the ACK/NACK transmission of the UE never happens. The CQI is transmitted every predetermined CQI transmission period.

Upon detecting the overlap between the UE's transmission times of ACK/NACK and CQI, the base station proceeds to step 1005 where it determines whether the UE has transmitted only ACK/NACK, omitting CQI transmission; the UE has transmitted CQI and ACK/NACK after joint coding; or the UE has TDM-transmitted CQI and ACK/NACK after separate coding.

If it is determined that the UE has transmitted only ACK/NACK, the base station proceeds to step 1006 where it extracts ACK/NACK from the resources allocated for CQI transmission. In step 1007, the base station decodes the extracted ACK/NACK to determine the UE's success/failure in data reception. However, if it is determined that the UE has transmitted CQI and ACK/NACK after joint coding, or the UE has TDM-transmitted CQI and ACK/NACK after separate coding, the base station proceeds to step 1008 where it extracts the joint-coded or TDM-multiplexed control signal from the resources allocated for CQI transmission. In step 1009, the base station decodes the extracted signal to extract ACK/NACK, and then determines the UE's success/failure in data reception. In addition, the base station checks CQI from the extracted signal to determine and acquire the current UE's channel state.

On the other hand, upon detecting the non-overlap between the UE's transmission times of ACK/NACK and CQI in step 1004, the base station proceeds to step 1010 where it determines whether ACK/NACK is received or CQI is received.

If the base station determines to perform ACK/NACK reception in step 1010, the base station extracts ACK/NACK from the resources allocated to the UE for ACK/NACK transmission in step 1012. In step 1014, the base station decodes the extracted ACK/NACK to determine the UE's success/failure in data reception. However, if the base station determines to perform CQI reception in step 1010, the base station extracts CQI information from the resources allocated for CQI information transmission in step 1016. In step 1018, the base station decodes the extracted CQI information to determine and acquire the channel state of the wireless environment where the UE is located.

A transmission/reception apparatus of the second embodiment is similar to that of the first embodiment, and can further include at least one channel coder, modulator, demodulator and decoder, which operate according to an operation, i.e., a control signal, of the controller, as the UE TDM-transmits ACK/NACK and CQI after joint coding or separate coding when simultaneously transmit the ACK/NACK and CQI. In addition, the transmission/reception apparatus further includes the controller's timing control operation based on TDM transmission.

Figure 11:
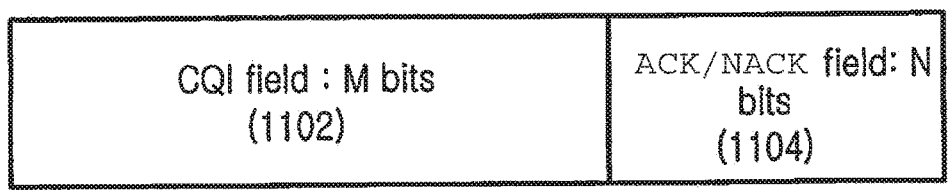
FIG. 11 is a diagram illustrating an example of generating control information by applying joint coding according to an embodiment of the present invention.

FIG. 11 is a diagram illustrating a method of generating control information by applying joint coding according to an embodiment of the present invention.

A base station, when transmitting downlink data to a UE, transmits a downlink control channel together, which includes control information such as the detailed resource information, modulation scheme and transmission format for the data transmission. Therefore, the base station supports data reception operation of the UE. However, even though the base station has transmitted the control information over the downlink control channel, a situation may happed, in which the UE cannot receive the control information over the downlink control channel because of deterioration of the wireless channel environment.

In this case, the base station expects to receive ACK/NACK for its data transmission from the UE at the time a predetermined UE's decoding processing time has elapsed after the data transmission. In this situation, however, since the UE has failed to receive the downlink control channel and data, it does not make ACK/NACK transmission to the base station. As result, discrepancy in transmission/reception signals may occur between the UE and the base station.

Also, when the ACK/NACK transmission times overlap the UE's CQI transmission times, the base station expects to receive ACK/NACK and CQI from the UE. In this situation, however, as the UE transmits only the CQI, discrepancy in transmission/reception signals may happen between the UE and the base station. In this case, the base station can determine that the UE has transmitted ACK/NACK and CQI together, raising a possible problem that it attempts to receive ACK/NACK from the CQI that the UE transmitted.

In order to solve this problem, the present invention, when simultaneously transmitting CQI and ACK/NACK, always allocates an ACK/NACK field during CQI transmission, i.e., sets in the ACK/NACK field an ACK/NACK value determined from the presence/absence of an error in the received data, and transmits it together with CQI information. When transmitting only the CQI information, the present invention sets the ACK/NACK field as NACK, and transmits it with CQI information after joint coding, thus avoiding the situation in which the base station wrongly detects the ACK/NACK field as ACK (False Alarm) when the UE has failed to receive control information over the downlink control channel.

Referring to FIG. 11, there is shown an exemplary structure of control information obtained by always allocating an N-bit ACK/NACK field 1104 regardless of the presence/absence of ACK/NACK when channel-coding CQI information, and then joint-coding it with M-bit CQI information 1302. This is applied to the joint coding of step 908, or the CQI generation of step 916. The joint coding can be block coding or convolutional coding.

Figure 12:
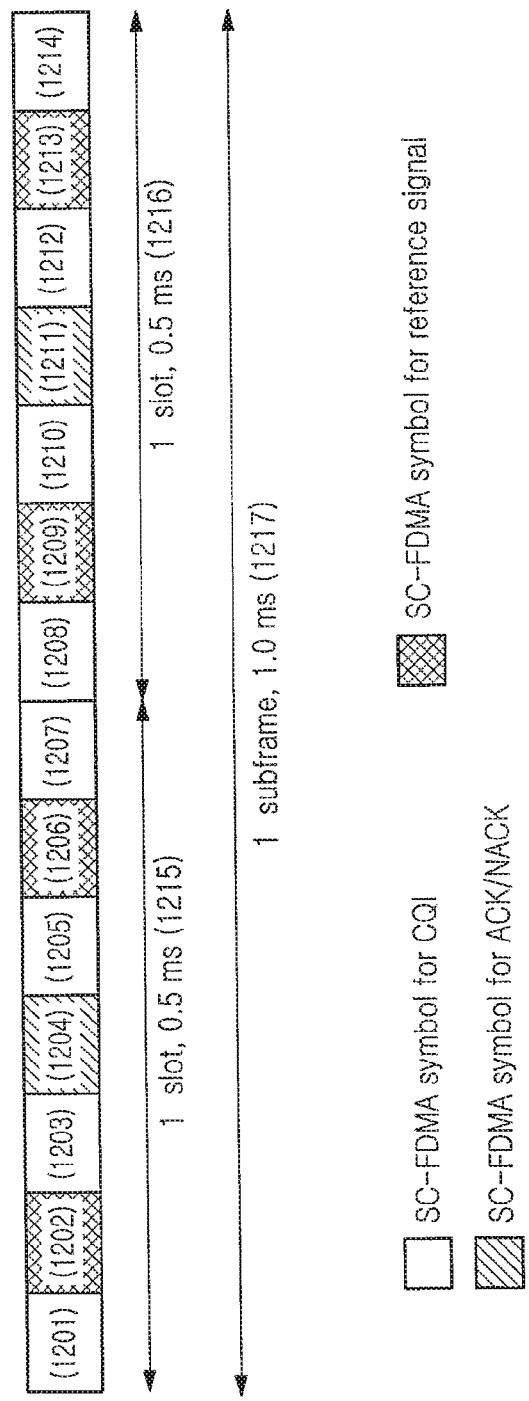
FIG. 12 is a diagram illustrating an example of generating a subframe by applying TDM according to an embodiment of the present invention.

FIG. 12 is a diagram illustrating an example of generating a subframe of control information by applying TDM according to an embodiment of the present invention.

In order to address the discrepancy in transmission/reception signals between the base station and the UE, the UE is adapted to always allocate particular SC-FDMA symbols as symbols for ACK/NACK regardless of the presence/absence of ACK/NACK during CQI information.

That is, when simultaneously transmitting CQI information and ACK/NACK, the UE maps an ACK/NACK value to the SC-FDMA symbols allocated for ACK/NACK. In addition, the UE maps coded symbols of CQI information to the SC-FDMA symbols allocated for CQI information, before transmission. On the other hand, when transmitting only the CQI information, the UE sets an SC-FDMA symbol for ACK/NACK as NACK, and maps the coded symbols of CQI information to the SC-FDMA symbols allocated for CQI information, before transmission.

The use of this method avoids the situation in which the base station wrongly detects the SC-FDMA symbol for ACK/NACK as ACK (False Alarm) when the UE has failed to receive control information received over the downlink control channel.

Referring to FIG. 12, there is shown an example of allocating SC-FDMA symbols 1204 and 1211 as symbols for ACK/NACK and allocating SC-FDMA symbols 1201, 1203, 1205, 1207, 1208, 1210, 1212 and 1214 as symbols for CQI information in one subframe 1217.

In this case, since ACK/NACK is higher than CQI in terms of the their required reception reliability, the UE is adapted to map ACK/NACK to the SC-FDMA symbols 1204 and 1211 situated between RS signals 1202 and 1206 (1209 and 1213) such as the two pilots having higher channel estimation performance in the left slot 1215 and the right slot 1216 of FIG. 12. In addition, the UE is adapted to map CQI to the remaining SC-FDMA symbols except for the SC-FDMA symbols allocated for ACK/NACK and the SC-FDMA symbols to which the RS signals are allocated, like the pilots.

Third Embodiment

A third embodiment provides a situation of transmitting ACK/NACK over several subframes to increase ACK/NACK reception performance of a base station when a UE transmits ACK/NACK in a mobile communication system supporting an uplink service. For example, when the UE is located in the cell boundary as it is far from the base station, since transmitting ACK/NACK only during one subframe may not satisfy a predetermined required ACK/NACK reception reliability, the UE can repeatedly transmit the ACK/NACK over several subframes, thereby allowing the base station to increase reception performance of ACK/NACK through combining of the received ACK/NACK signals.

Figure 13:
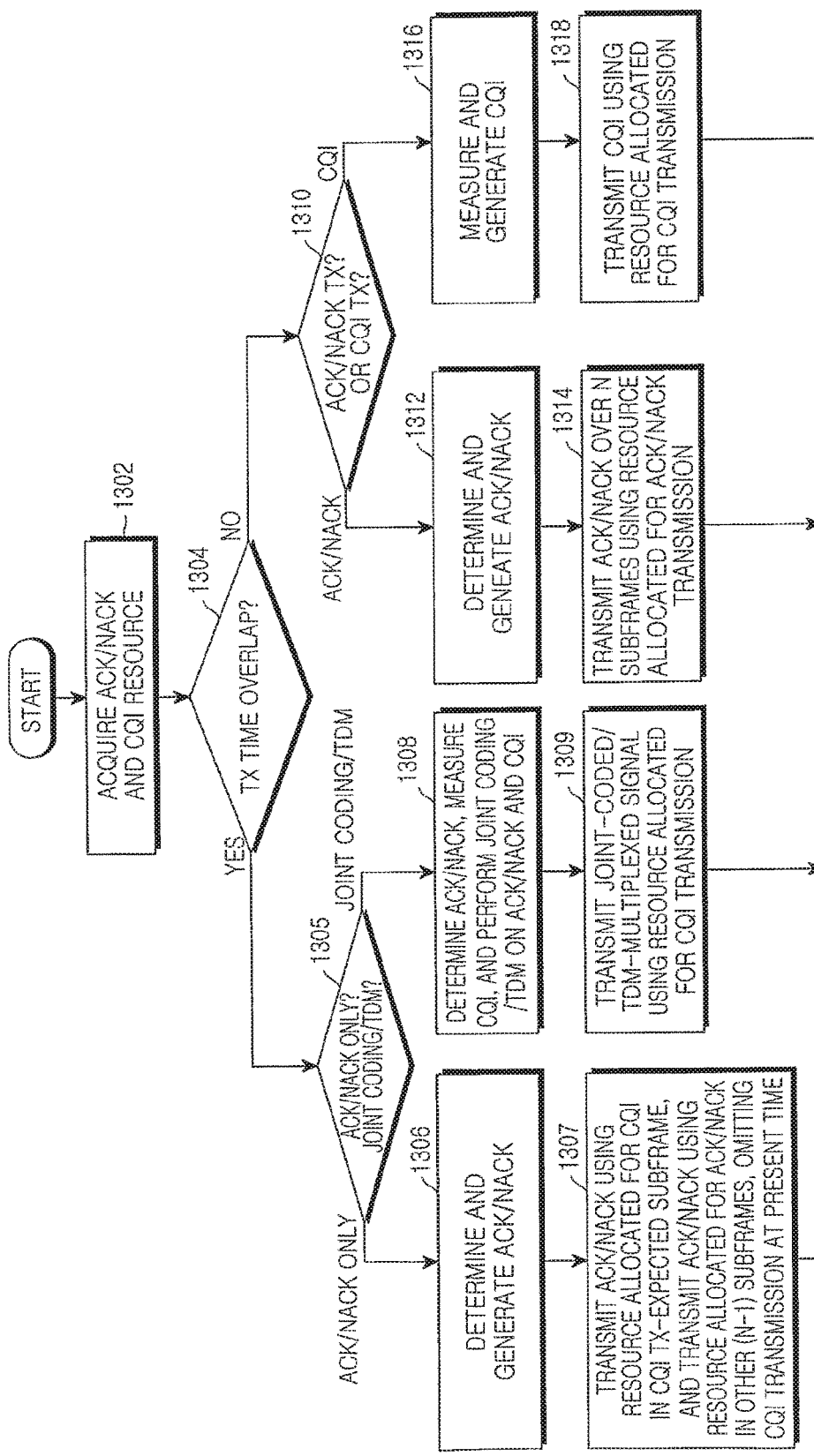
FIG. 13 is a diagram illustrating a control information transmission procedure of a transmission side according to a third embodiment of the present invention.

FIG. 13 illustrates a control information transmission procedure of a transmission side according to the third embodiment of the present invention.

Referring to FIG. 13, in step 1302, a UE acquires resources for transmission of ACK/NACK and CQI information from a base station. At the same time, the UE acquires from the base station, through signaling, the information indicating over how many (N) subframes it should repeatedly transmit the ACK/NACK. The 'N' value should be determined so as to satisfy the ACK/NACK reception reliability, taking into account conditions such as the distance between the base station and the UE, the wireless channel environment, etc. For example, when N=1 and the UE is located in the cell boundary, it is difficult to satisfy the ACK/NACK reception reliability with N=1. Therefore, the 'N' value can be determined such that N>1.

In step 1304, the UE determines whether it should transmit ACK/NACK and CQI at the same transmission time. Upon detecting the overlap between the transmission times of ACK/NACK and CQI, the UE proceeds to step 1305 where the UE determines whether it will transmit only ACK/NACK, omitting CQI information transmission; whether it will transmit CQI and ACK/NACK after joint coding; or whether it will TDM-transmit CQI and ACK/NACK after separate coding.

If the UE determines to transmit only ACK/NACK in step 1305, the UE proceeds to step 1306 where it determines the presence/absence of an error in the received data. The UE generates ACK in the absence of an error, and generates NACK in the presence of an error. In step 1307, the UE transmits the generated ACK/NACK over N subframes in such a manner that it transmits the ACK/NACK using the resources allocated for CQI in the CQI transmission-scheduled subframe, and transmits the ACK/NACK using the resources allocated for ACK/NACK in the other (N−1) subframes.

If the UE determines to transmit CQI and ACK/NACK after joint coding or to TDM-transmit CQI and ACK/NACK after separate coding in step 1305, the UE proceeds to step 1308 where it determines the presence/absence of an error in the received data. The UE generates ACK in the absence of an error, and generates NACK in the presence of an error. Further, the UE measures the channel state from RSs received from the base station, and generates CQI information according to a predefined format. In step 1309, the UE transmits the joint-coded signal or TDM-multiplexed signal of the generated ACK/NACK and CQI using the resources allocated for CQI transmission.

Upon detecting the non-overlap between the transmission times of ACK/NACK and CQI in step 1304, the UE proceeds to step 1310 where the UE determines whether it will perform ACK/NACK transmission or will perform CQI information transmission. If the UE determines to perform ACK/NACK transmission in step 1310, the UE checks the decoding result on the data received from the base station in step 1312. The UE generates ACK in the absence of a decoding error, and generates NACK in the presence of a decoding error. In step 1314, the UE transmits the generated ACK/NACK over N subframes using the resources allocated for ACK/NACK transmission.

If the UE determines to perform CQI transmission in step 1310, the UE measures the channel state from RSs received from the base station and generates CQI in step 1316. In step 1318, the UE transmits the generated CQI information using the resources allocated for CQI information transmission.

Figure 14:
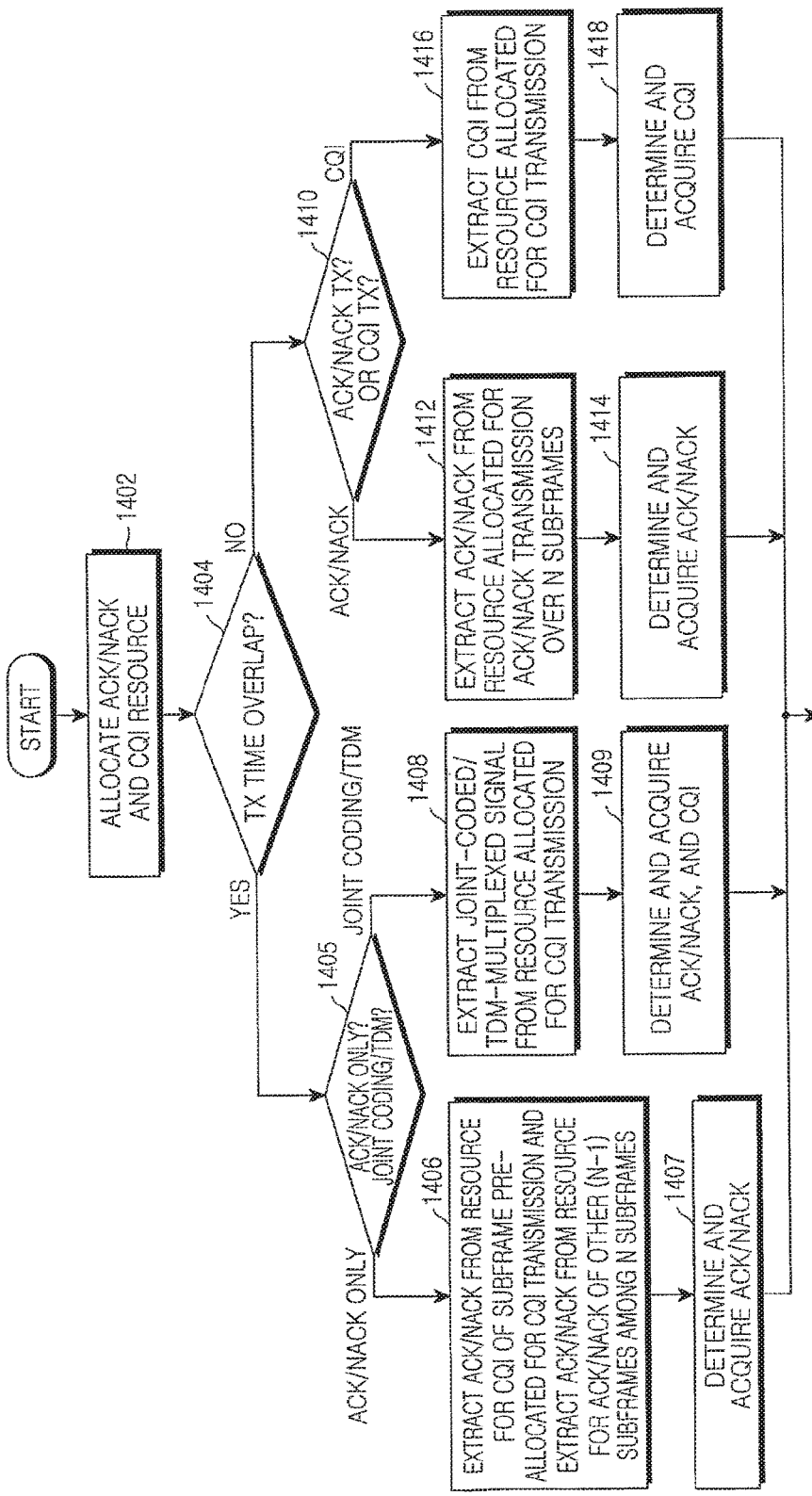
FIG. 14 is a diagram illustrating a control information reception procedure of a reception side according to the third embodiment of the present invention.

FIG. 14 illustrates a control information reception procedure of a reception side according to the third embodiment of the present invention.

Referring to FIG. 14, in step 1402, a base station allocates resources for ACK/NACK and CQI transmission to each of a plurality of UEs under its control. At the same time, the base station provides, through signaling, a particular UE with the information indicating over how many (N) subframes the particular UE should repeatedly transmit the ACK/NACK.

In step 1404, the base station determines whether UE's transmission times of ACK/NACK and CQI, that it desires to receive from the particular UE, overlap each other. Upon detecting the overlap between the UE's transmission times of ACK/NACK and CQI information, the base station proceeds to step 1405 where it determines whether the UE has transmitted only ACK/NACK, omitting CQI transmission; whether the UE has transmitted CQI and ACK/NACK after joint coding; or whether the UE has TDM-transmitted CQI and ACK/NACK after separate coding. If it is determined in step 1405 that the UE has transmitted only ACK/NACK, the base station proceeds to step 1406 where it extracts ACK/NACK from the resources for CQI of a subframe allocated to the particular UE for CQI transmission in the current frame among the N subframes, and extracts ACK/NACK from the resources for ACK/NACK in the other (N−1) subframes. In step 1407, the base station combines the ACK/NACK extracted over a total of N subframes, and then decodes the combined result to determine whether the particular UE has received the downlink data from the base station without error.

If it is determined in step 1405 that the UE has transmitted CQI and ACK/NACK after joint coding, or the UE has TDM-transmit CQI and ACK/NACK after separate coding, the base station proceeds to step 1408 where it extracts the joint-coded or TDM-multiplexed signal from the resources pre-allocated to the UE for CQI transmission. In step 1409, the base station decodes the extracted signal to extract ACK/NACK, and then determines whether the UE has received the data without error. Further, the base station extracts CQI information from the extracted signal to determine and acquire the channel state.

On the other hand, upon detecting the non-overlap between the UE's transmission time of ACK/NACK and CQI in step 1404, the base station proceeds to step 1410 where it determines whether ACK/NACK is received or CQI information is received. Upon receipt of ACK/NACK in step 1410, the base station extracts ACK/NACK from the resources allocated to the UE for ACK/NACK transmission over N subframes in step 1412. In step 1414, the base station combines the ACK/NACK extracted from the N subframes, and then decodes the combined result to determine the UE's success/failure in data reception. However, upon receipt of CQI information in step 1410, the base station extracts CQI information from the resources allocated to the UE for CQI information transmission in step 1416. Thereafter, in step 1418, the base station decodes the extracted CQI information to determine and acquire the channel state.

A transmission/reception apparatus of the third embodiment is similar to that of the first embodiment, and further includes an operation of transmitting/receiving ACK/NACK over N subframes.

As is apparent from the foregoing description, according to the present invention, the UEs transmit CQI and ACK/NACK through allocated separate resources, ensuring orthogonality between UEs and/or between control information. The ensured orthogonality contributes to a reduction in PAPR performance degradation caused by multiple UEs. Further, when the UE is in the fast moving environment, the present invention transmits an ACK/NACK signal of the UE through a resource region that uses one cyclic shift, contributing to a reduction in PAPR performance degradation between ACK/NACK signals caused by the multi-code transmission. In addition, the invention always transmits the ACK/NACK signal by joint coding it together with CQI, thereby preventing the possible ACK/NACK detection error of the base station. Moreover, the present invention combines ACK/NACK signals transmitted over one or more subframes, increasing ACK/NACK reception performance of the base station.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of a terminal in a mobile communication system, the method comprising:
   identifying first resources related to a physical uplink control channel (PUCCH) format for first uplink control information in response to receiving downlink data;
   identifying second resources for second uplink control information;
   determining whether a transmission time of the first resources for the first uplink control information overlaps a transmission time of the second resources for the second uplink control information;
   multiplexing the first uplink control information and the second uplink control information if the transmission times overlap each other; and
   transmitting the multiplexed first uplink control information and second uplink control information in the PUCCH format using the identified first resources,
   wherein the multiplexing comprises:
      appending at least one bit of the second uplink control information to at least one bit of the first uplink control information to generate the multiplexed fir uplink control information and second uplink control information, and
   wherein the first resources include at least one resource block on a time domain and a frequency domain, a cyclic shift value related to the PUCCH format, and an orthogonal sequence.

2. The method of claim 1, wherein the first uplink control information is allocated to a resource block between resource blocks to which a pilot signal is allocated.

3. The method of claim 1, wherein the first uplink control information includes an ACKnowledgement/Negative ACKnowledgement (ACK/NACK) indicating presence/absence of an error in the received downlink data.

4. A method of base station (BS) in a mobile communication system, the method comprising:
   identifying first resources related to a physical uplink control channel (PUCCH) format for first uplink control information in response to transmitting downlink data;
   identifying second resources for second uplink control information;
   determining whether a transmission time of the identified first resources for the first uplink control information overlaps a transmission time of the second resources for the second uplink control information; and
   receiving, from a terminal, if the transmission times overlap each other, multiplexed uplink control information comprising the first uplink control information and the second uplink control information in the PUCCH format using the identified first resources,
   wherein the first uplink control information and the second uplink control information are multiplexed if the transmission times overlap each other,
   wherein the multiplexed uplink control information is generated in the terminal by appending at least one bit of the second uplink control information to at least one bit of the first uplink control information, and
   wherein the first resources include at least one resource block on a time domain and a frequency domain, a cyclic shift value related to the PUCCH format, and an orthogonal sequence.

5. The method of claim 4, wherein the first uplink control information is allocated to a resource block between resource blocks to which a pilot signal is allocated.

6. The method of claim 4, wherein the first uplink control information includes an ACKnowledgement/Negative ACKnowledgement (ACK/NACK) indicating presence/absence of an error in the transmitted downlink data.

7. A terminal in a mobile communication system, the terminal comprising:
   a controller configured to identify first resources related to a physical uplink control channel (PUCCH) format for first uplink control information in response to receiving downlink data, identify second resources for second uplink control information, and determine whether a transmission time of the identified first resources for the first uplink control information overlaps a transmission time of the second resources for the second uplink control information; and
   a transmitter configured to multiplex the first uplink control information and the second uplink control information if the transmission times overlap each other, and transmit the multiplexed first uplink control information and second uplink control information in the PUCCH using the identified first resources,
   wherein the transmitter is further configured to:
      append at least one bit of the second uplink control information to at least one bit of the first uplink control information to generate the multiplexed first uplink control information and second uplink control information, and
   wherein the first resources include at least one resource block on a time domain and a frequency domain, a cyclic shift value related to the PUCCH format, and an orthogonal sequence.

8. The terminal of claim 7, further comprising a mapper for mapping the first uplink control information to a resource block between resource blocks to which a pilot signal is allocated.

9. The terminal of claim 7, wherein the first uplink control information includes an ACKnowledgement/Negative ACKnowledgement (ACK/NACK) indicating presence/absence of an error in the received downlink data.

10. A base station (BS) in a mobile communication system, the BS comprising:
   a controller configured to identify first resources related to a physical uplink control channel (PUCCH) format for first uplink control information in response to transmitting downlink data, identify second resources for second uplink control information, and determine whether a transmission time of the identified first resources for the first uplink control information overlaps a transmission time of the second resources for the second uplink control information; and
   a receiver configured to receive, from a terminal, if the transmission times overlap each other, multiplexed uplink control information comprising the first uplink control information and the second uplink control information in the PUCCH format using the identified first resources,
   wherein the first uplink control information and the second uplink control information are multiplexed if the transmission times overlap each other,
   wherein the multiplexed uplink control information is generated in the terminal by appending at least one bit of the second uplink control information to at least one bit of the first uplink control information, and wherein the first resources include at least one resource block on a time domain and a frequency domain, a cyclic shift value related to the PUCCH format, and an orthogonal sequence.

11. The BS of claim 10, further comprising:
a demapper for demapping the first uplink control information from a resource block between resource blocks to which a pilot signal is allocated.

12. The BS of claim 10, wherein the first uplink control information includes an ACKnowledgement/Negative ACKnowledgement (ACK/NACK) indicating presence/absence of an error in the transmitted downlink data.

* * * * *